(12) United States Patent
Von Deylen

(10) Patent No.: US 11,811,358 B2
(45) Date of Patent: Nov. 7, 2023

(54) SOLAR MODULE MOUNTING SYSTEM

(71) Applicant: APA Solar, LLC, Ridgeville Corners, OH (US)

(72) Inventor: Josh Von Deylen, Bryan, OH (US)

(73) Assignee: APA Solar, LLC, Ridgeville Corners, OH (US)

( * ) Notice: Subject to any disclaimer, the term of this patent is extended or adjusted under 35 U.S.C. 154(b) by 0 days.

(21) Appl. No.: 17/677,120

(22) Filed: Feb. 22, 2022

(65) Prior Publication Data
US 2022/0182011 A1    Jun. 9, 2022

Related U.S. Application Data

(63) Continuation-in-part of application No. 16/787,307, filed on Feb. 11, 2020, now Pat. No. 11,258,397.

(51) Int. Cl.
*H02S 30/10* (2014.01)
*F16B 2/06* (2006.01)

(52) U.S. Cl.
CPC ............... *H02S 30/10* (2014.12); *F16B 2/06* (2013.01)

(58) Field of Classification Search
CPC .......... H02S 20/10; H02S 20/20; H02S 30/10; F16B 5/0635; F16B 5/0685; F16B 2/06
See application file for complete search history.

(56) References Cited

U.S. PATENT DOCUMENTS

| | | |
|---|---|---|
| 1,656,044 A | 1/1928 | Cibulas |
| 6,672,018 B2 | 1/2004 | Shingleton |
| 7,634,875 B2 | 12/2009 | Genschorek |
| 8,181,926 B2 | 5/2012 | Magno, Jr. et al. |
| 8,407,895 B2 | 4/2013 | Hartelius et al. |
| 8,413,944 B2 | 4/2013 | Harberts et al. |
| 8,505,864 B1 | 8/2013 | Taylor et al. |
| 8,572,909 B2 | 11/2013 | Rivera et al. |
| 8,590,223 B2 | 11/2013 | Kilgore et al. |
| 8,713,881 B2 | 5/2014 | DuPont et al. |
| 8,745,935 B2 | 6/2014 | DuPont et al. |
| 8,857,113 B2 * | 10/2014 | Zhang ................... F16B 7/187 52/173.3 |
| 8,894,424 B2 | 11/2014 | DuPont |
| 8,925,263 B2 | 1/2015 | Haddock et al. |
| 8,955,259 B2 | 2/2015 | Hemingway |
| 9,051,950 B2 | 6/2015 | Jaffari |
| 9,068,764 B2 | 6/2015 | Moore et al. |
| 9,097,443 B2 | 8/2015 | Liu et al. |
| 9,281,778 B2 | 3/2016 | Corio et al. |

(Continued)

*Primary Examiner* — Stanton L Krycinski
(74) *Attorney, Agent, or Firm* — Jacob M. Ward; Ward Law Office LLC

(57) ABSTRACT

A system and method for mounting solar modules includes a step of positioning a solar module in a clamp to orient the solar module in a desired first position. The clamp has a top bracket and a resilient clip operatively connected to the top bracket. The top bracket has at least one flange that extends over an upper surface of the solar module. The clip has at least one leg that extends under a lower surface of the solar module. The at least one leg has at least one barb on the end of the leg. The at least one leg supports the solar module in the first position. The method also includes steps of advancing the solar module to a second desired position, and advancing the top bracket in a direction towards the clip to secure the solar module in the desired second position.

5 Claims, 24 Drawing Sheets

(56) References Cited

U.S. PATENT DOCUMENTS

| | | | |
|---|---|---|---|
| 9,331,629 B2 | 5/2016 | Cheung et al. | |
| 9,416,992 B2 | 8/2016 | Braunstein et al. | |
| 9,425,732 B2 | 8/2016 | Durney et al. | |
| 9,506,600 B1 | 11/2016 | Li | |
| 9,531,319 B2 * | 12/2016 | Braunstein | F24S 25/70 |
| 9,553,544 B2 | 1/2017 | Nayar | |
| 9,660,570 B2 | 5/2017 | Stephan et al. | |
| 9,876,465 B2 | 1/2018 | Depauw | |
| 9,893,436 B2 | 2/2018 | Martin | |
| 9,985,575 B2 * | 5/2018 | Stearns | F24S 25/636 |
| 10,020,411 B2 | 7/2018 | Beck et al. | |
| 10,069,455 B2 | 9/2018 | Corio et al. | |
| 10,205,418 B2 | 2/2019 | Nayar | |
| 10,364,567 B2 | 7/2019 | Shang | |
| 10,644,644 B2 | 5/2020 | Dick et al. | |
| 10,749,459 B1 | 8/2020 | Liu et al. | |
| 10,897,223 B2 * | 1/2021 | Stearns | F24S 25/632 |
| 11,313,591 B1 * | 4/2022 | Atia | F24S 25/636 |
| 2003/0177706 A1 | 9/2003 | Ullman | |
| 2013/0167907 A1 | 7/2013 | Bitarchas et al. | |
| 2014/0151312 A1 | 6/2014 | Cusson | |
| 2015/0200621 A1 | 7/2015 | Reed et al. | |
| 2015/0249423 A1 * | 9/2015 | Braunstein | F16B 5/0685 52/173.3 |
| 2018/0294768 A1 | 10/2018 | Wang et al. | |
| 2019/0178274 A1 | 6/2019 | Katz | |
| 2020/0313604 A1 | 10/2020 | Harris et al. | |

* cited by examiner

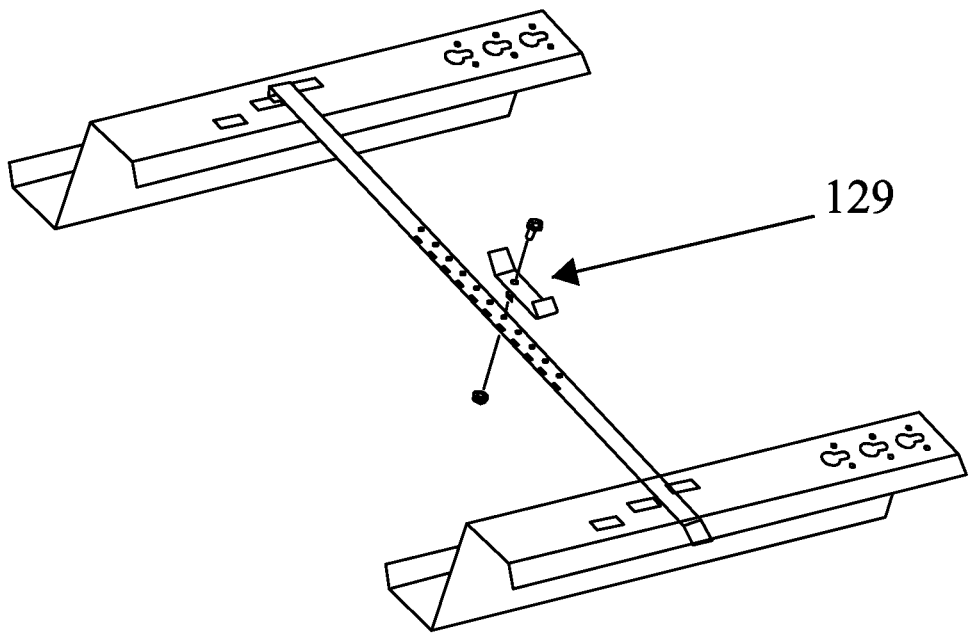
FIGURE 26
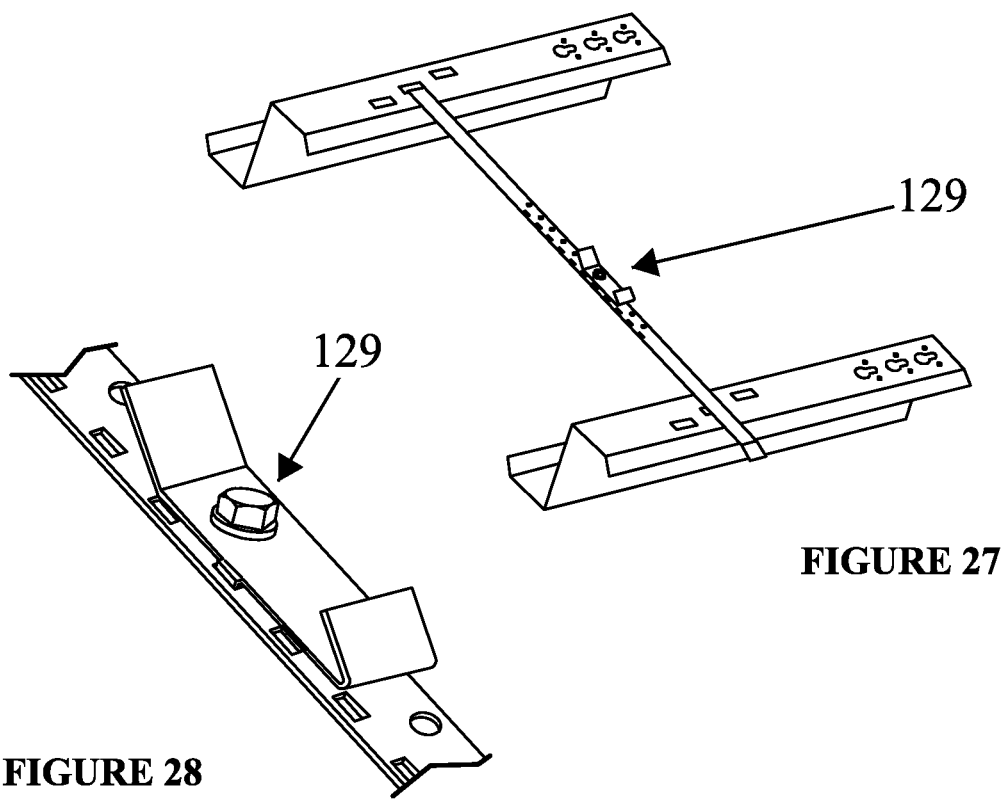
FIGURE 27
FIGURE 28

SOLAR MODULE MOUNTING SYSTEM

CROSS-REFERENCE TO RELATED APPLICATIONS

This application is a continuation-in-part of U.S. patent application Ser. No. 16/787,307, filed Feb. 11, 2020, and issued as U.S. Pat. No. 11,258,397 on Feb. 22, 2022. The entire disclosure of the above application is hereby incorporated herein by reference.

FIELD

The present disclosure relates to solar module mounting systems and methods, and more particularly, to systems and methods involving solar module mounting clips.

INTRODUCTION

This section provides background information related to the present disclosure which is not necessarily prior art.

Prior art mounting systems for solar modules do not provide a clip that allows hanging and then engaging the solar module.

There is continuing need for a mounting system and method that simplifies the positioning and securing of the solar modules with respect to a mounting rack.

SUMMARY

In concordance with the instant disclosure, a mounting system and method that simplifies the positioning and securing of the solar modules with respect to a mounting rack, has been surprisingly discovered.

In one embodiment, a method for mounting solar modules includes a step of positioning one of the solar modules in a clamp to orient the solar module in a desired first position. The clamp has a top bracket and a resilient clip operatively connected to the top bracket. The top bracket has at least one flange that extends over an upper surface of the solar module. The clip has at least one leg that extends under a lower surface of the solar module. The at least one leg has at least one barb on the end of the leg. The at least one leg supports the solar module in the first position. The method also includes a step of advancing the solar module to a second desired position. The at least one barb engages a shoulder on the lower surface of the solar module in the second desired position. The method further includes a step of advancing the top bracket in a direction towards the clip to secure the solar module in the desired second position.

In another embodiment, a mounting system for a solar module uses a resilient clip to locate and secure the solar module in a desired location.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 26 is an exploded perspective view of an assembly according to another embodiment of the present disclosure;

FIG. 27 is a perspective view of an assembly according to the present disclosure, depicting a clip coupled to a strap and the strap coupled to opposing rails;

FIG. 28 is a close-up perspective view of the clip of FIG. 27 coupled to the strap according to the present disclosure;

DETAILED DESCRIPTION

Figure 1:
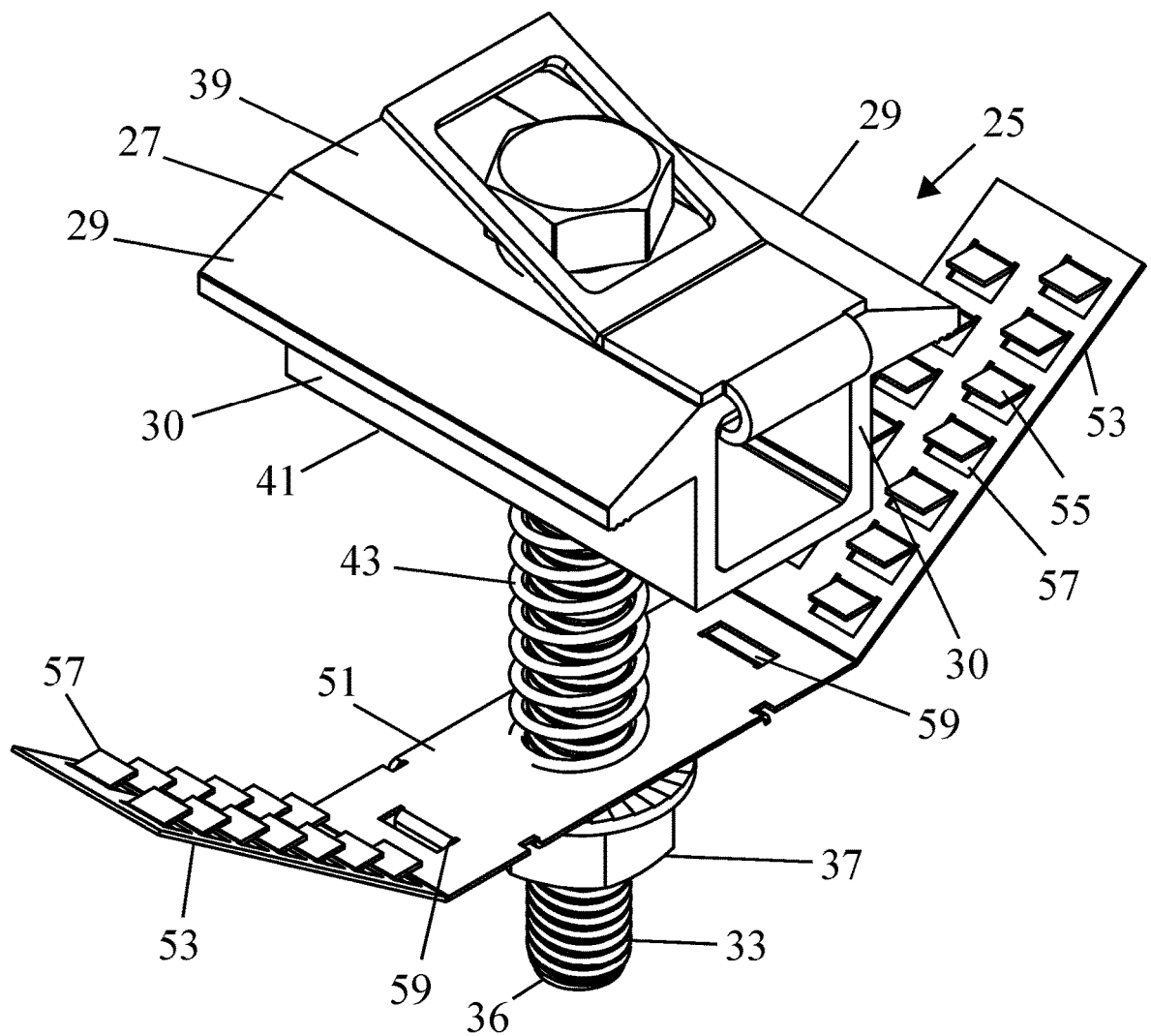
FIG. 1 is a side elevational perspective view of the present disclosure.
Figure 2:
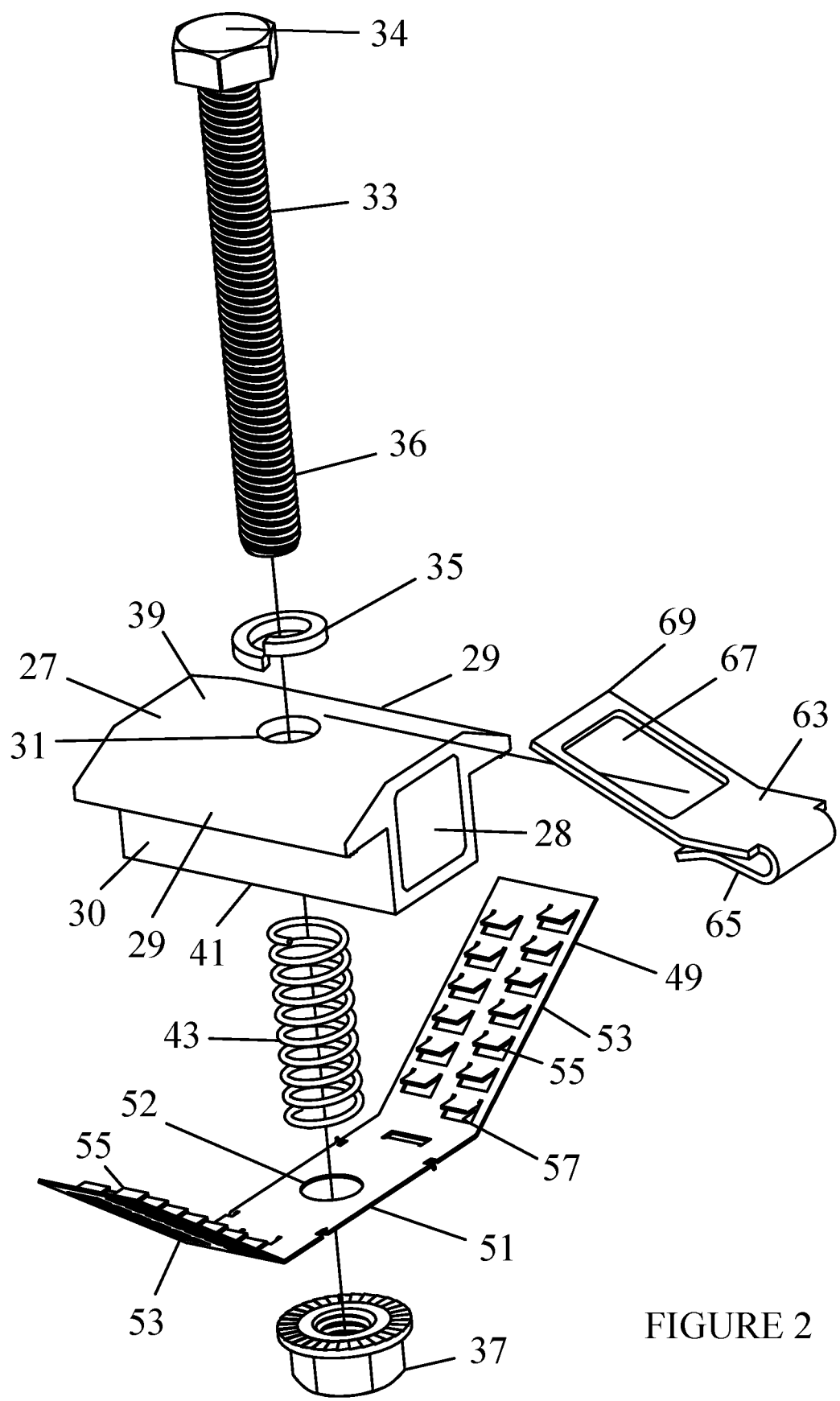
FIG. 2 is an exploded view of FIG. 1.
Figure 3:
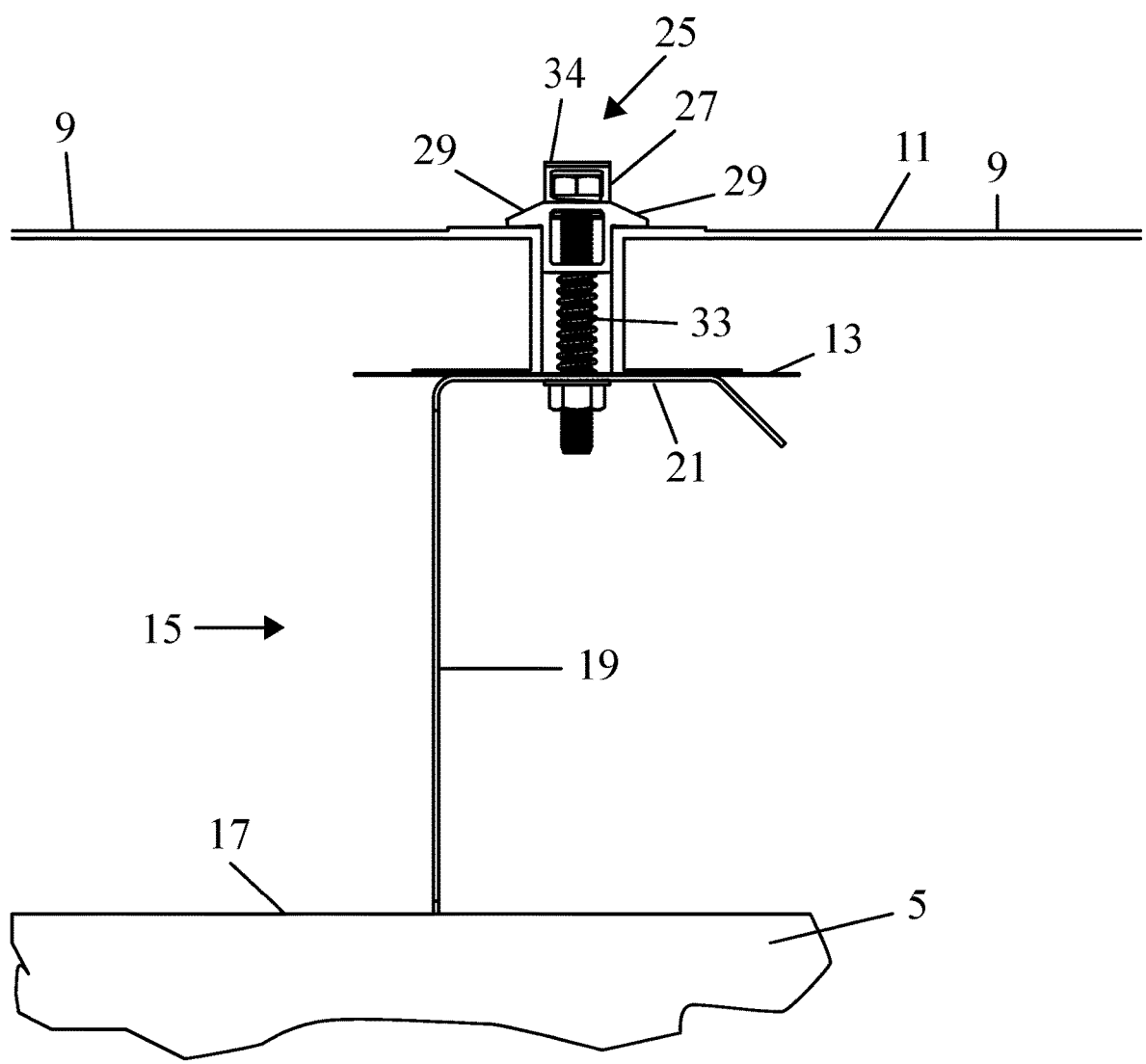
FIG. 3 is a side elevational view of the present disclosure mounted on a structure.
Figure 4:
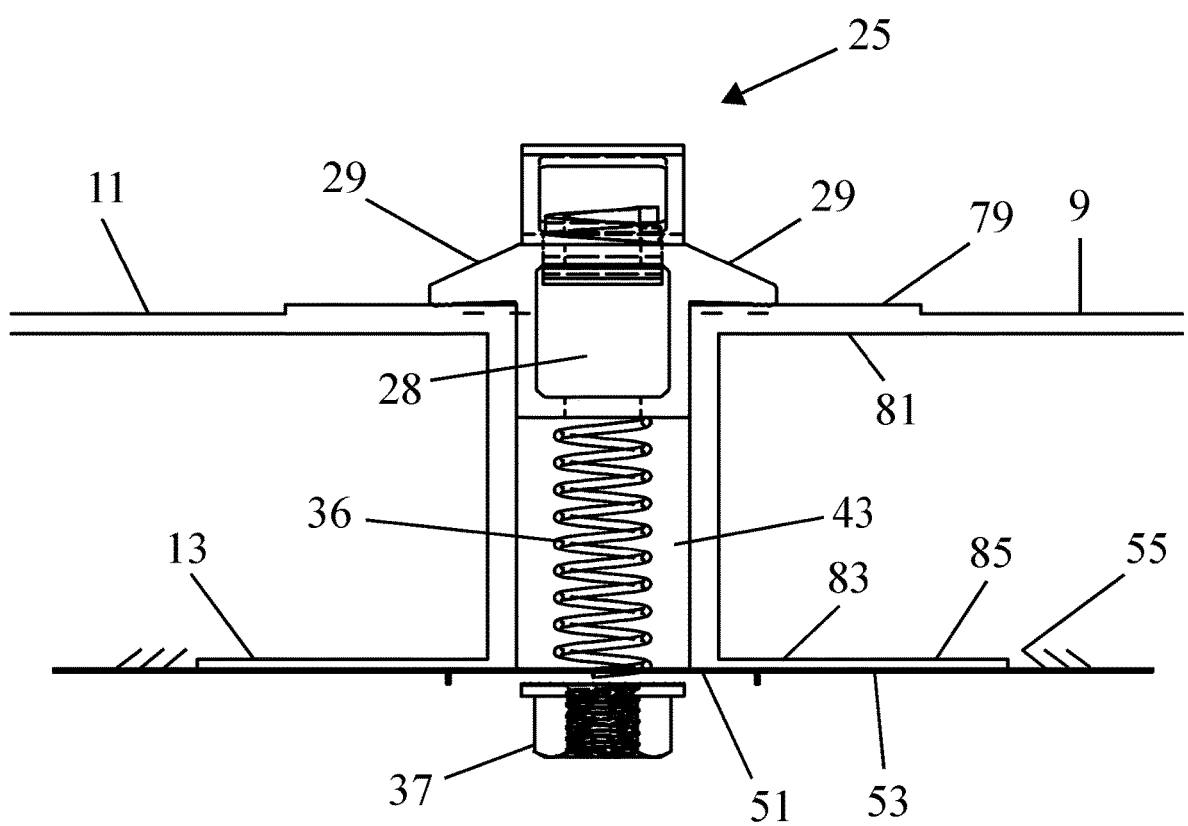
FIG. 4 is a partial exploded view of FIG. 3.
Figure 5:
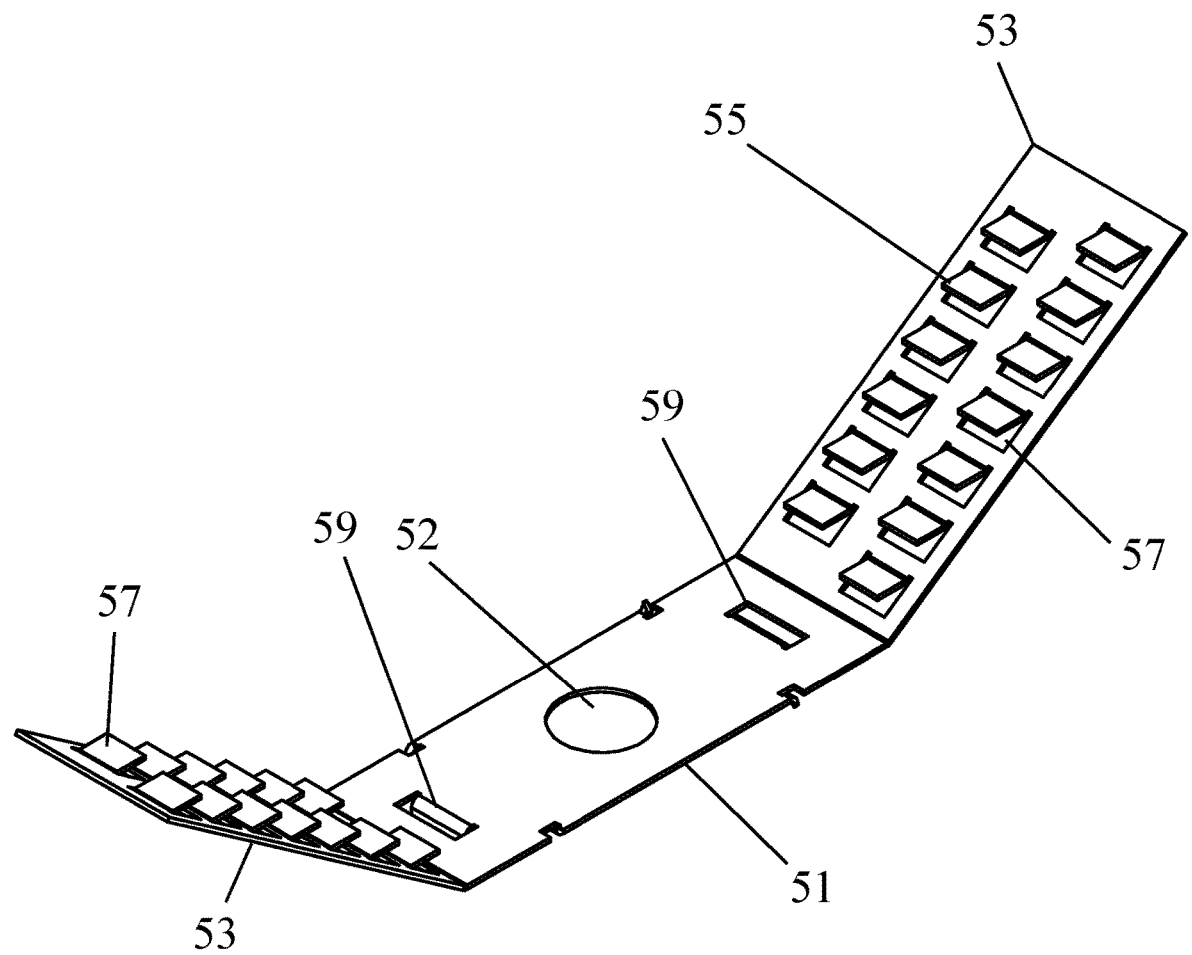
FIG. 5 is a top perspective view of the clip of the present disclosure.
Figure 6:
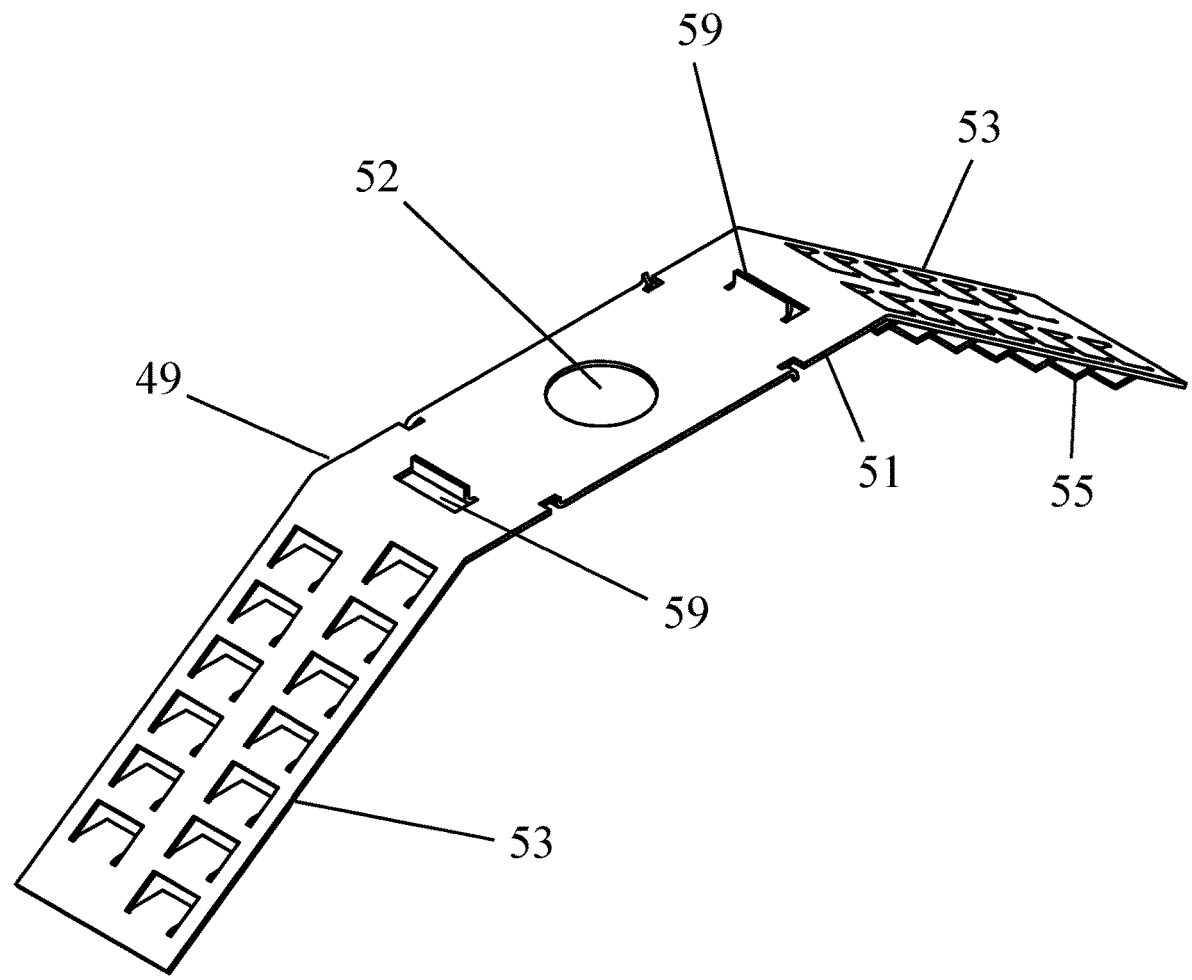
FIG. 6 is a bottom perspective view of the clip.
Figure 7:
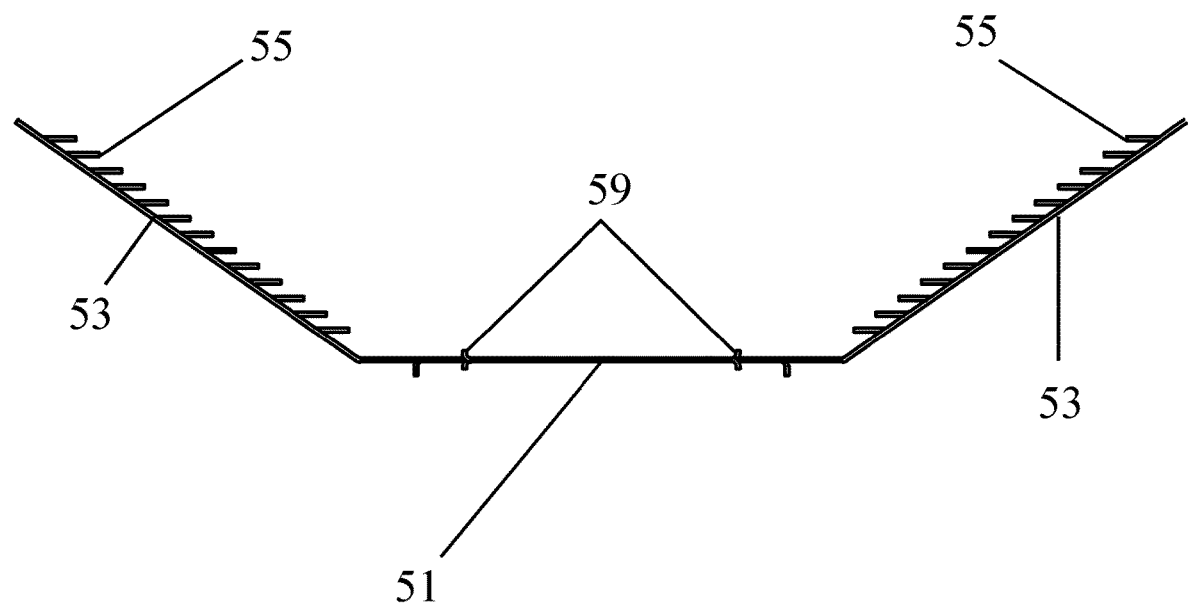
FIG. 7 is a side elevational view of the clip.
Figure 8:
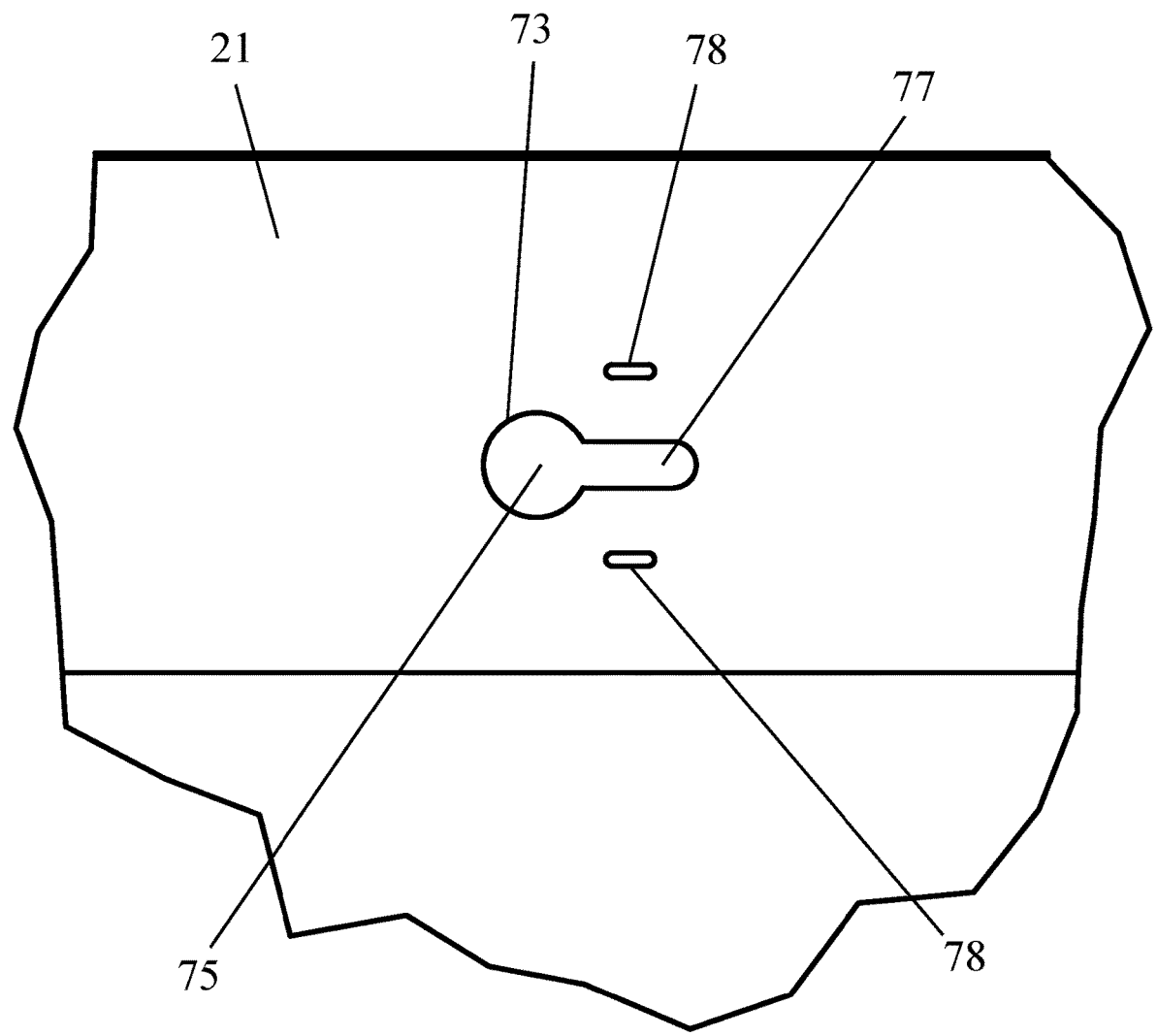
FIG. 8 is a partial bottom view of the mounting rack.
Figure 9:
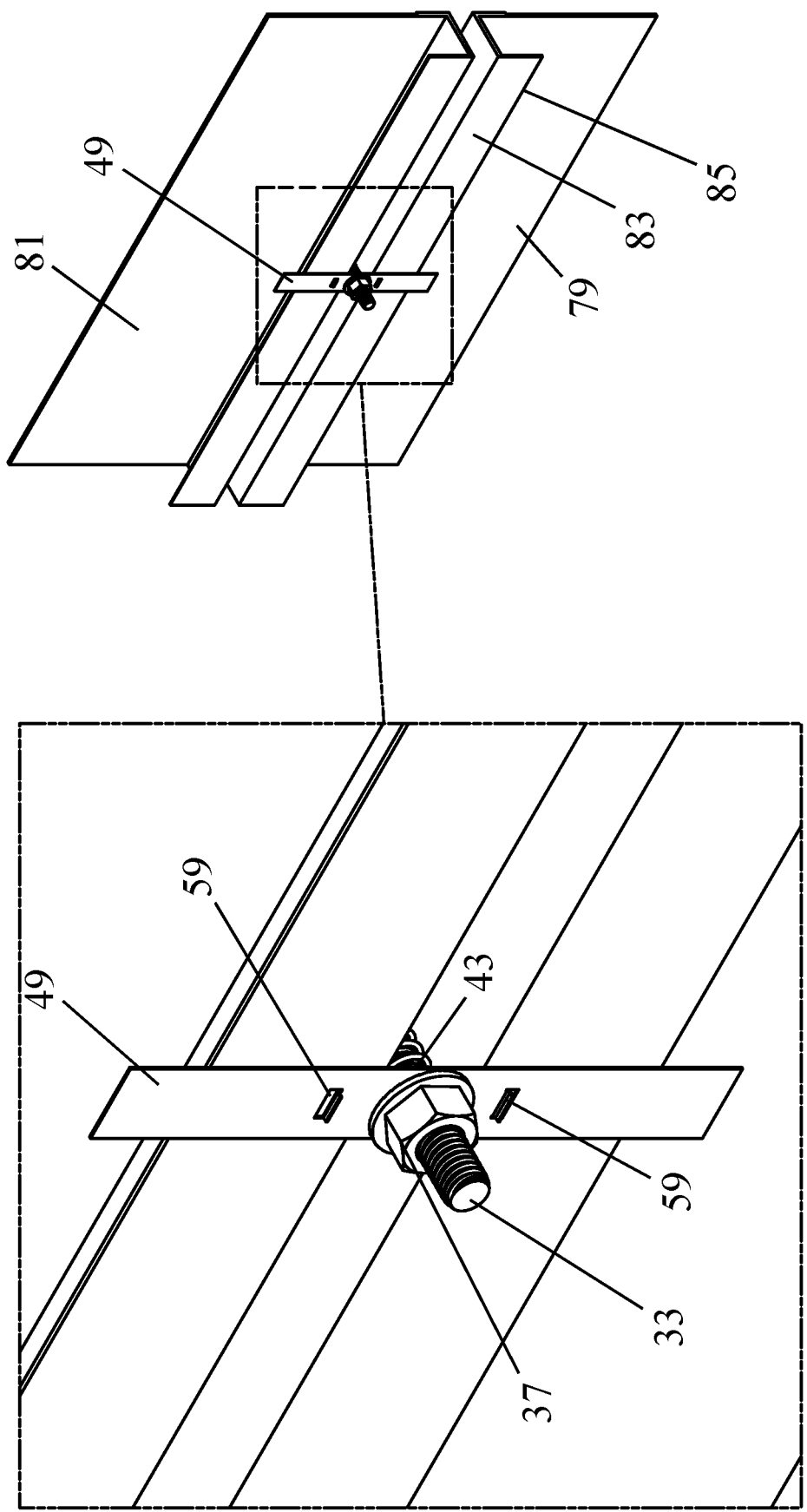
FIG. 9 is a partial perspective view of the present disclosure.

The following description of technology is merely exemplary in nature of the subject matter, manufacture, and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed.

The terms "a" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. The term "about" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it can be directly on, engaged, connected, or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

The present disclosure is directed to a clip which can be used to assist in securing solar modules onto a mounting rack. The mounting rack is used to support the solar modules on the ground, on a building or other structure, with the solar modules positioned to gather solar energy. More particularly, the clip is designed to accommodate solar modules of different sizes and configurations to provide a more universal way to mount the solar modules. The features of the present disclosure will be more fully understood by referring to the attached drawings in connection with the following description.

As shown in FIGS. 1-9, the present disclosure is designed to mount solar modules on a structure 5. The mounting system allows the solar modules to be positioned in a first location on a mounting rack 15. The first location allows the solar modules to be quickly located in a temporary position on the mounting rack. When the solar modules are all in the first position, the solar modules are moved to a second location on the mounting rack and the mounting system is engaged to secure the solar modules in the second position on the mounting rack. The first position allows the solar modules to be oriented on the mounting rack and final adjustments made to the position of the solar modules. When the solar modules are in the desired first location, the solar modules are advanced to the second position, where the solar modules can be locked into position by the mounting system. The ability of the mounting system to temporarily hold the solar modules in a first position and to allow for adjustment of the solar modules in this first position increases the flexibility of the mounting system in positioning the solar modules and quickly achieving an acceptable arrangement of the solar modules on the mounting rack. Once this desired temporary location is achieved the solar modules are moved slightly to allow the mounting system to engage the solar modules to hold the solar modules in the second location. Once the solar modules are in the second location the mounting system is engaged to secure the solar modules in the second location.

The flexibility provided by the mounting system allows the solar modules to be more efficiently positioned on the mounting rack and reduces the installation time and cost for the solar modules. A mounting rack 15 is positioned on the structure for supporting and locating the solar modules 9. The mounting rack has a base 17 that is secured to the structure 5. A support column 19 extends from the base 17 in a direction away from the structure 5. The support column 19 is positioned to be substantially perpendicular to the base 17. A mounting plate 21 extends from the end of the support column 19 that is spaced apart from the base 17. The mounting plate 21 is disposed to be substantially perpendicular to the support column 19 and substantially parallel to the base.

A clamp 25 is operatively connected to the mounting plate 21 on the rack 15. The clamp has a top bracket 27 with opposed substantially parallel sides 30. Flanges 29 extend from each opposed side 30 of the top bracket. The top bracket is substantially rectangular in shape. There is a hollow portion 28 in the center of the top bracket. An aperture 31 extends through the top bracket 27 from the top 39 through the bottom 41 of the top bracket. The aperture is perpendicular to the longitudinal axis of the top bracket 27. A bolt 33 having a head 34 is positioned in the aperture 31 and extends through the top bracket 27. The head 34 of the bolt 33 is designed to engage the top 39 of the top bracket. A lock washer 35 can be positioned between the head 34 of the bolt 33 in the top 39 of the top bracket 27.

A portion 36 of the bolt 33 extends beyond the bottom 41 of the top bracket 27. A spring 43 is positioned around the portion 36 of the bolt that extends beyond the bottom 41 of the top bracket. One end of the spring is designed to engage the bottom 41 of the top bracket 27. A resilient clip 49, having a center portion 51 with an opening 52, is positioned on the end of the bolt 33 that extends beyond the end of the spring 43 that is spaced apart from the top bracket 27. The other end of the spring is designed to engage the side of the center portion 51 that faces the bottom 41 of the top bracket. The bolt extends from the opening 52 in the center portion 51 of the clip. On each side of the center portion 51 there are resilient legs 53 that extend from the center portion. The clip 49 is made from stainless spring steel or similar material that is resilient and that will return to its original shape if it is displaced from its original shape. The resilient legs 53 are initially disposed at an angle from about 20 degrees to about 30 degrees, with respect to the center portion 51. The resilient legs extend from the center portion 51 in a direction towards the top bracket 27. A plurality of barbs 55 are formed on the resilient legs 53. The barbs extend from the resilient legs 53 in a direction towards the top bracket 27. The barbs terminate in an end 57 that is raised from the resilient legs 53. The barbs extend from the resilient legs a distance from about 0.25 of an inch to about 0.75 of an inch. At least two grounding tabs 59 are formed in the center portion 51 of the clip 49. The at least two grounding tabs extend from the center portion and in a direction towards the top bracket 27. The at least two grounding tabs 59 extend from the center portion in a direction away from the top bracket 27. The grounding tabs are disposed to engage the mounting plate 21 and to function as a ground for the solar module 9. The grounding tabs also function to prevent the clip from rotating with respect to the mounting plate.

A nut 37 is positioned on the end of the bolt 33 that extends through the opening 52 in the center portion 51. The nut is disposed to engage the surface of the mounting plate 21 that is spaced apart from the resilient clip 49. The spring 43 on the bolt 33 resiliently biases the center portion 51 of the clip 49 against the nut 37 and resiliently biases the top bracket 27 against the head 34 of the bolt 33.

A safety spring 63 can be utilized with the clamp 25. The safety spring has a U-shaped portion 65 and one leg of the U-shaped portion extends into the hollow portion 20 of top bracket 27. A resilient flange 69 extends from the U-shaped portion 65 over the top 39 of the top bracket 27. An opening 67 is provided in the resilient flange. The opening 67 is designed to fit around the head 34 of the bolt 33 that extends through the clamp 25. The resilient flange is disposed to extend at an angle, with respect to the head on the bolt. If it is necessary to access the head of the bolt to make adjustments in the clamp 25, the resilient flange 69 is displaced in a direction towards the top 39 of the top bracket 27 to provide access to the head 34 of the bolt 33. The sides 68 of the opening 67 are designed to engage the head 34 of the bolt 33 to assist in preventing the bolt from turning when the safety spring 63 is in the undisplaced position.

A plurality of keyhole-shaped openings 73 are positioned in the mounting plate 21 of the mounting rack 15. The keyhole-shaped openings have a circular section 75 and a slot portion 77 that extends from the circular section 75. The circular section 75 is designed so that the nut 37 can fit through the circular section. The nut extends through the circular section 75 in a direction towards the structure 5. The slot portion 77 is designed to be slightly larger than the diameter of the bolt 33. Accordingly, the bolt 33 can be advanced into the slot portion 77.

The diameter of the nut 37 is larger than the width of the slot portion 77 so that the nut will engage the side of the mounting plate 21 that faces the structure 5. The center portion 51 of the clip 49 will engage the side of the mounting plate 20 that is spaced apart from the structure. Alignment slots 78 can be positioned adjacent the slot portion 77. The grounding tabs 59 that extend from the center portion 51 in a direction towards the structure 5 are designed to fit into the alignment slots to properly position the clip 49 with respect to the mounting rack 15. The center portion 51 of the resilient clip can be advanced in a direction towards the top bracket 27 of the clamp 25 by compressing the resilient spring 43 to allow the clamp 25 to be secured in the slot portion 77 of the keyhole-shaped opening 73 in the mounting plate 21.

A solar module 9 is positioned on each side of the clamp 25 to secure the solar modules to the mounting rack 15. Each solar module has a top 11 and a bottom 13. A bracket 79 is positioned on the end of each solar module and the bracket extends along a small portion of the top side and bottom side of each solar module. The top 81 of the bracket extends for a short distance along the top 11 of the solar module 9. The top 81 of the bracket is designed to fit under the flange 29 that extends from each side of the top bracket 27 of the clamp 25. The bottom 83 of the bracket 79 extends along a portion of the bottom 13 of the solar module 9. The bottom of the bracket terminates in an end 85 that is spaced apart a short distance from the end wall of the bracket. The end 85 of the bottom 83 of the bracket 79 is designed to engage an end 57 of the barbs 55 that are positioned on the resilient legs 53 of the clip 49. The resilient legs 53 of the clip 49 can be displaced in a direction towards the mounting plate 21 of the mounting rack 15 to facilitate the positioning of the solar modules 9 in the clamp 25.

In operation, the clamps 25 are mounted on the mounting plate 21 of the mounting rack 15 in the manner previously described. As the mounting rack 15 is secured to the structure 5, this provides a base upon which the solar modules 9 can be suspended or positioned with respect to the structure. The bottom 13 of the solar module engages one of the resilient legs 53 of the clip 49 and the resilient leg is displaced in a direction towards the mounting plate 21. This allows the solar module to be advanced in a direction towards the bolt 33 of the clamp 25 so that the top 81 of the bracket 79 on the end of the solar module can extend under the flange 29 on that side of the top bracket 27 where the solar module is to be positioned. At the same time, the bottom 83 of the bracket 79 is advanced in the resilient leg 53 of the clip 49. The solar modules 9 are positioned in a first position on the resilient leg of the clip. This is a temporary position where the solar modules 9 can be aligned and oriented as desired on the mounting rack. The solar modules are not secured in place in this first position. Once the solar modules are all in the desired first position, the solar modules are advanced slightly towards the bolt 33 to a second position on the mounting rack. Once the solar modules are in the second position, the end 85 of the bottom 83 of the bracket 79 will advance over the barbs 55 until the solar module is in the desired position. At that point one of the barbs 55 on the resilient leg 53 will engage the end 85 of the bracket 79 and resist movement of the solar panel in a direction away from the bolt 33. The resilient leg 53 of the clip 49 will provide a biasing force that presses the bottom 83 of the bracket 79 in a direction towards the top bracket 27 of the clamp 25. This biasing force helps to secure the solar module 9 in the clamp 25. A solar module 9 is usually positioned on each side of the clamp 25. Once the solar modules are in the second position in the clamp 25, the nut 37 on the bolt 33 can be advanced in a direction towards the top bracket 27 to further secure the solar modules 9 in the clamp 25. Advancing the nut 37 in a direction towards the top bracket 27 also helps to secure the bolt 33 in the slot portion 77 of the keyhole-shaped opening 73 in the mounting plate 21 of the mounting rack 15. A grounding tab 59 in the center portion 51 of the clip 49 engages the bottom 13 of the solar module 9 and a grounding tab 59 in the center portion 51 engages the mounting plate 21 of the mounting rack 15. This engagement of the grounding tabs 59 allows for an electrical grounding path for the solar modules.

Figure 10:
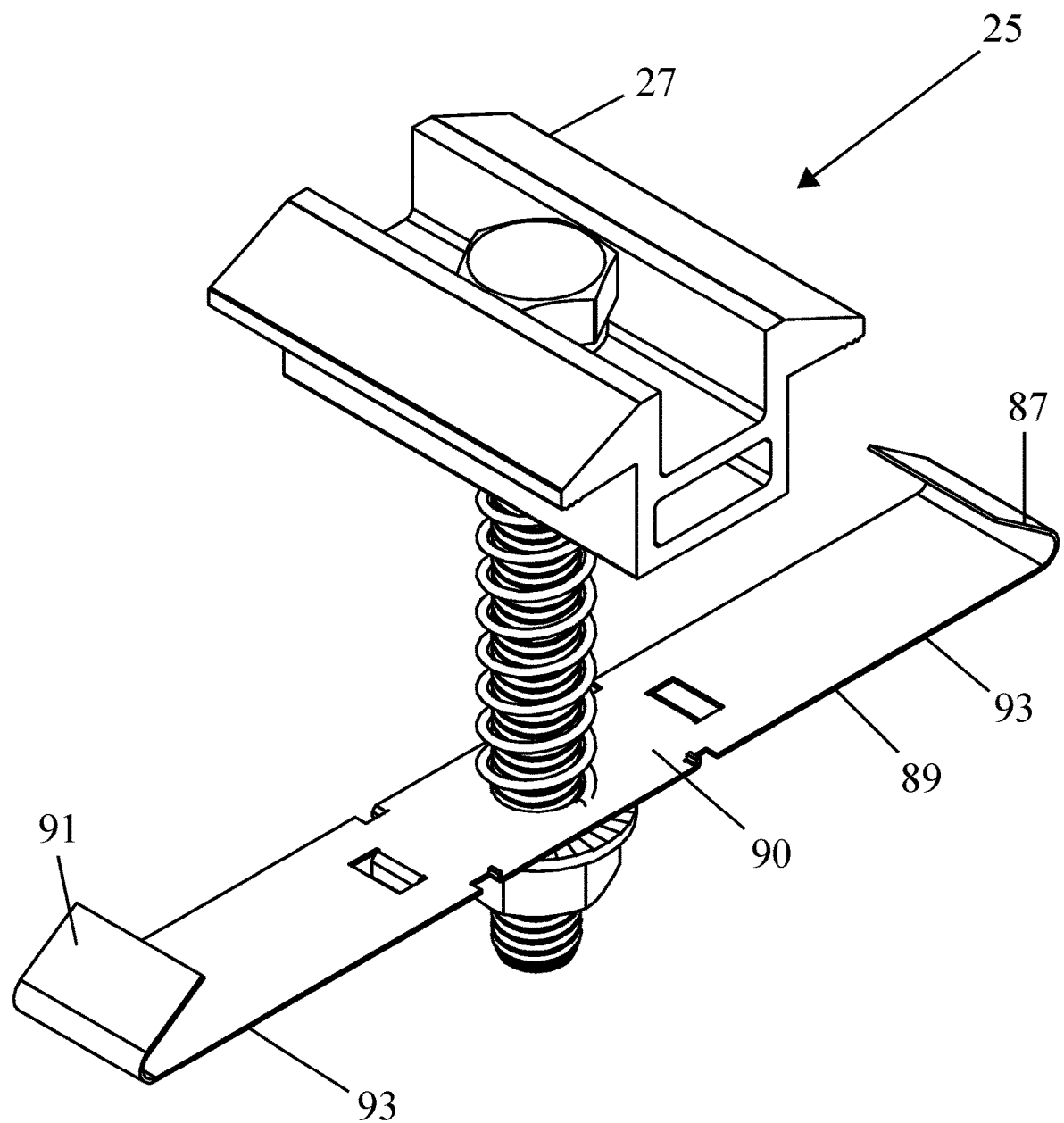
FIG. 10 is a partial perspective view of the clamp.
Figure 11:
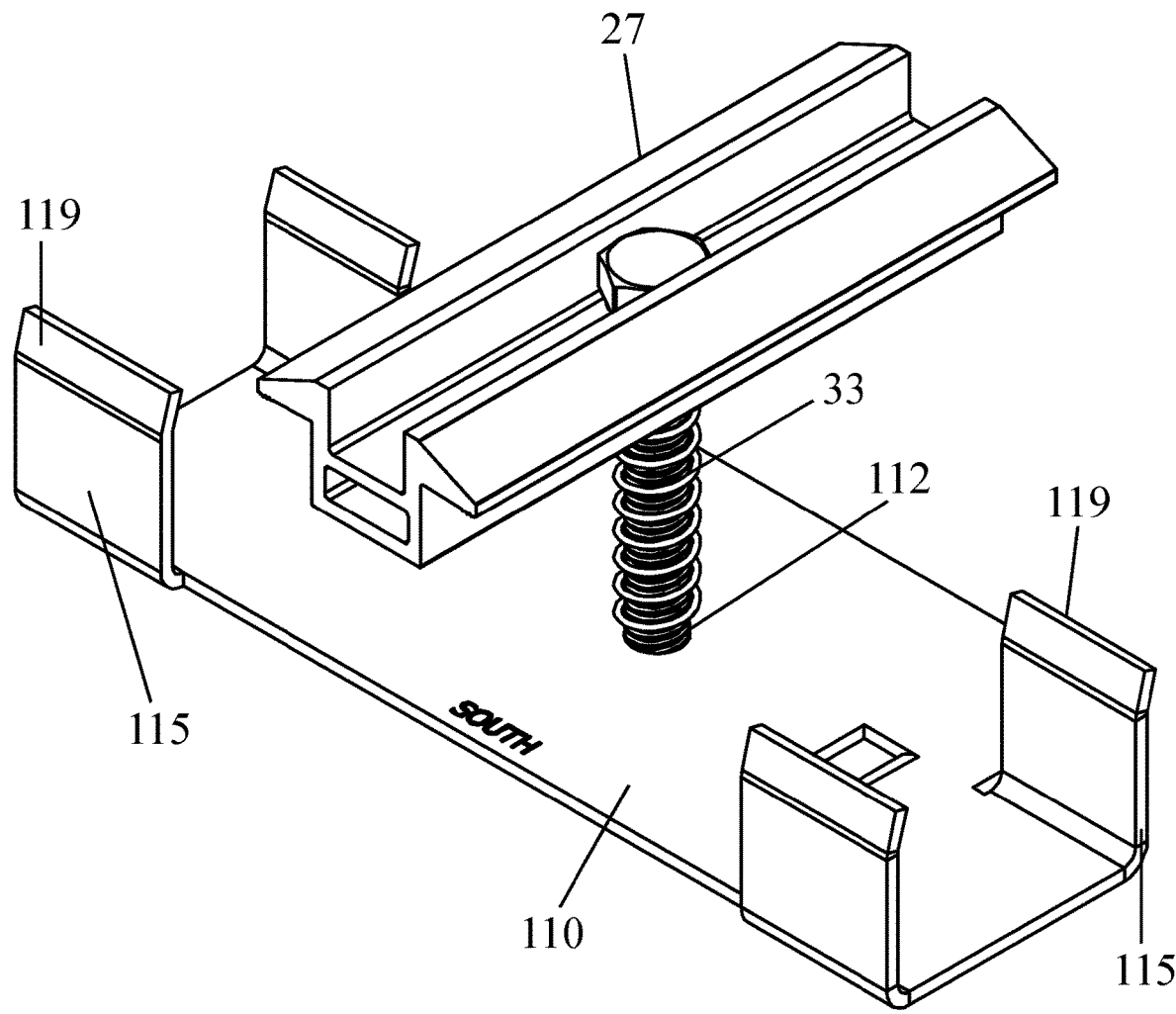
FIG. 11 is a perspective view of the clamp.
Figure 12:
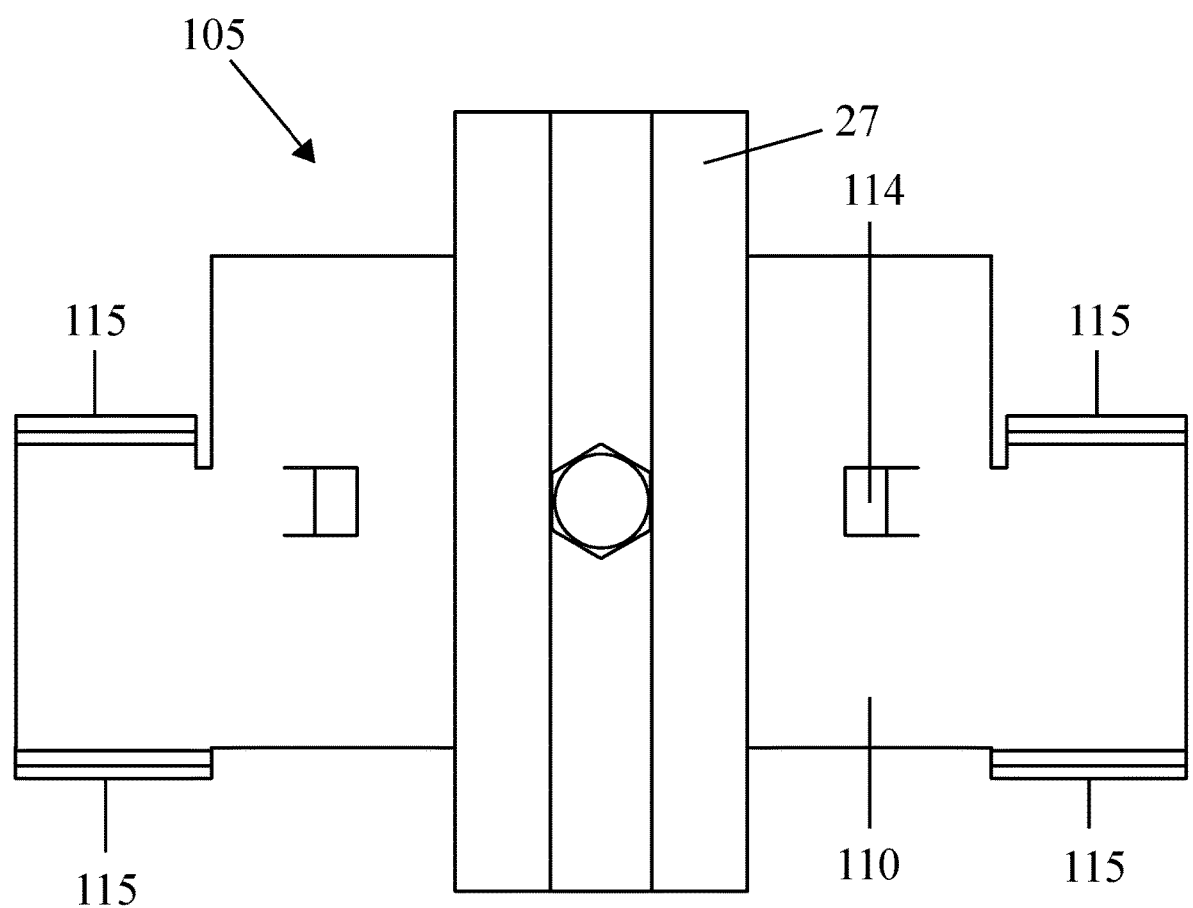
FIG. 12 is a top view of the clamp of the present disclosure.
Figure 13:
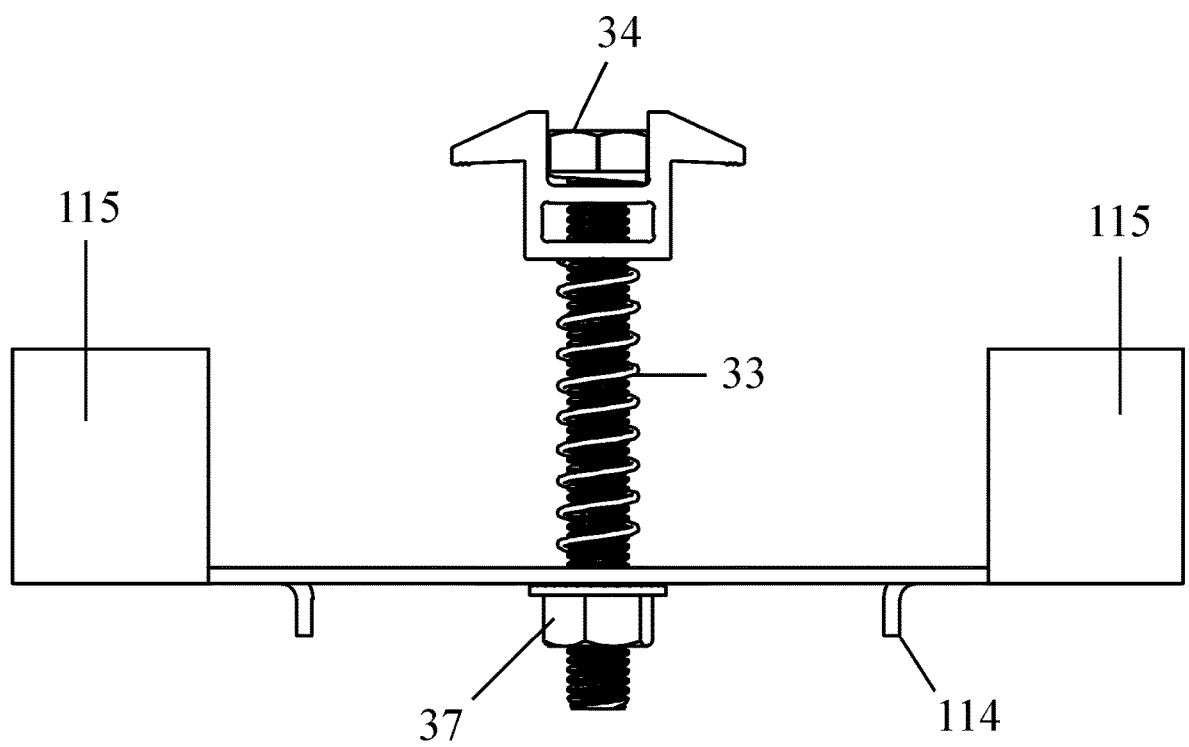
FIG. 13 is a partial perspective view of the clamp.
Figure 14:
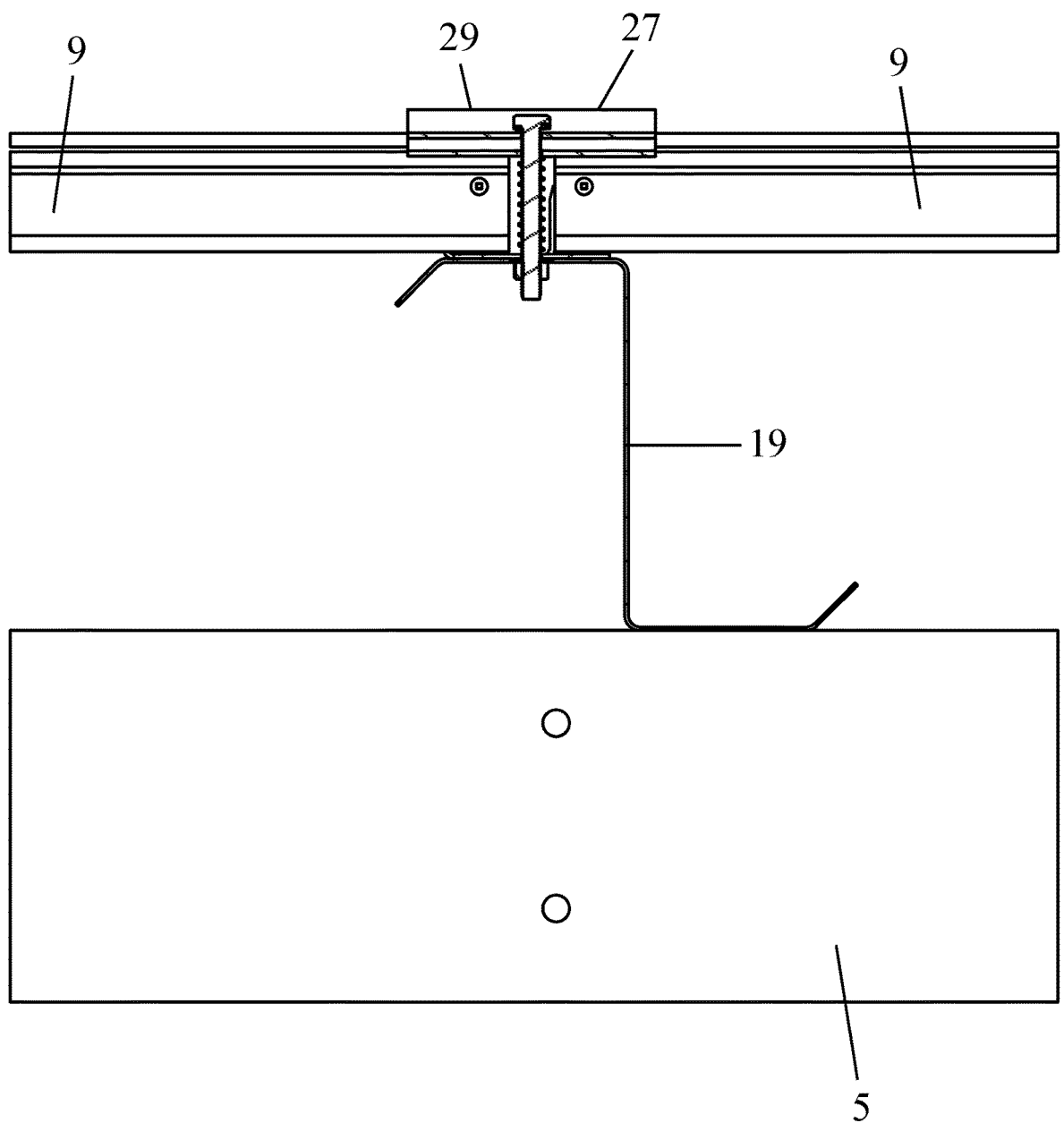
FIG. 14 is a side elevational view of the present disclosure.
Figure 15:
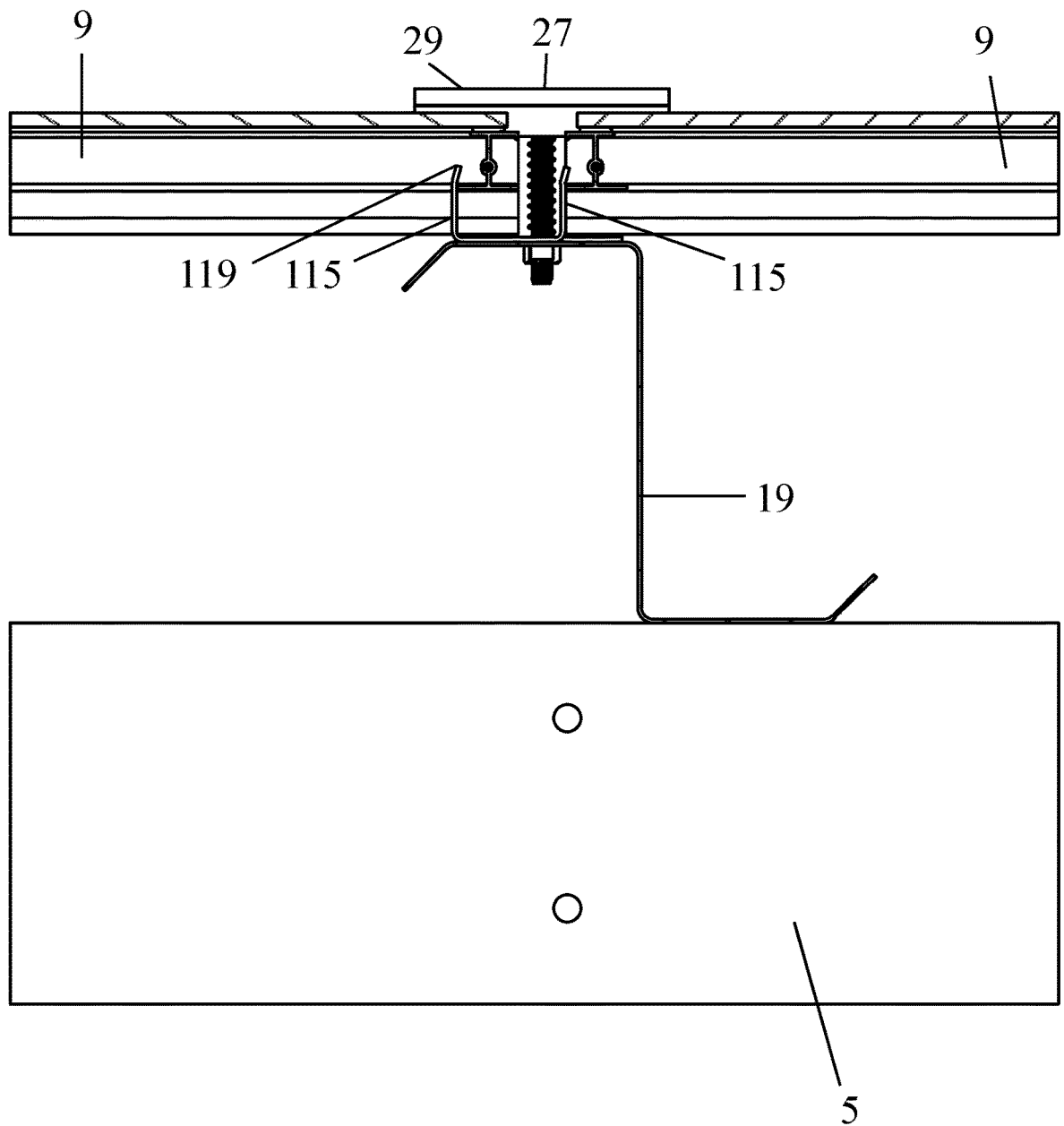
FIG. 15 is a side elevational view.

FIG. 10 shows another feature of the present disclosure. The resilient clip used with the clamp 25 has a different configuration. The resilient clip 89 has a barb 87 location on each end of resilient legs 93 that extend from the center section 91 of the resilient clip. The barb 87 is in the shape of hook 91 that extends over the side of the legs 93 that faces the top bracket 27. The hook 91 is disposed on the legs 93 to engage the end 85 of the bracket 79 when the solar modules are in the second position. The hook acts to retain the solar modules in the desired second position by engaging the end 85 of the bracket 79 that is secure to the solar module. The resilient clip 89 of FIG. 10 functions in the same manner as the previously described clip 49.

FIGS. 11, 12, 13 and 14 show another feature for the resilient clip of the present disclosure. The clip 105 of this mounting system has a center portion 110 with an opening 112 that is positioned on the end of the bolt 33 in the manner previously described. Tabs 114 extend from the center portion and engage alignment slots 78 on the mounting plate 21 of the mounting rack 15. The tabs have the same shape and size as the previously described grounding tabs 59. The engagement between the tabs 114 and the mounting plate prevent the clip 105 from rotating with respect to the mounting plate. Resilient legs 115 extend from the side of each end of the center portion. The resilient legs 115 are disposed in opposed parallel relationship on each end of the center section. The resilient legs extend from about one inch to about two inches from the center portion 110. A section 116 extends from one side of the center portion beyond the resilient legs 115 on that side of the center portion. A barb 119 is located on the end 121 of each resilient leg 115. The barbs extend at an angle from about one inch to about 2 inches from the end of each of the resilient legs 115. The barbs are disposed to extend in a direction towards the opposed resilient legs positioned on the same end of the center portion 110. The barbs are designed to engage a shoulder 121 on the solar modules, allow the solar modules to be positioned in a desired location and to be secured to the mounting rack 15 by advancing the top bracket 27 towards the solar modules 9 in the manner previously described.

Figure 16:
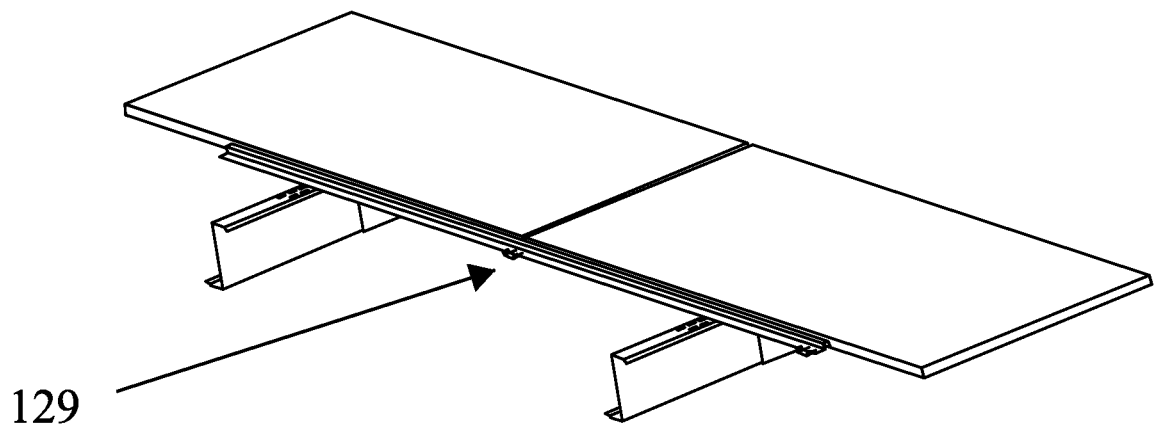
FIG. 16 is a perspective view of a solar panel installation using a clip according to the present disclosure.
Figure 17:
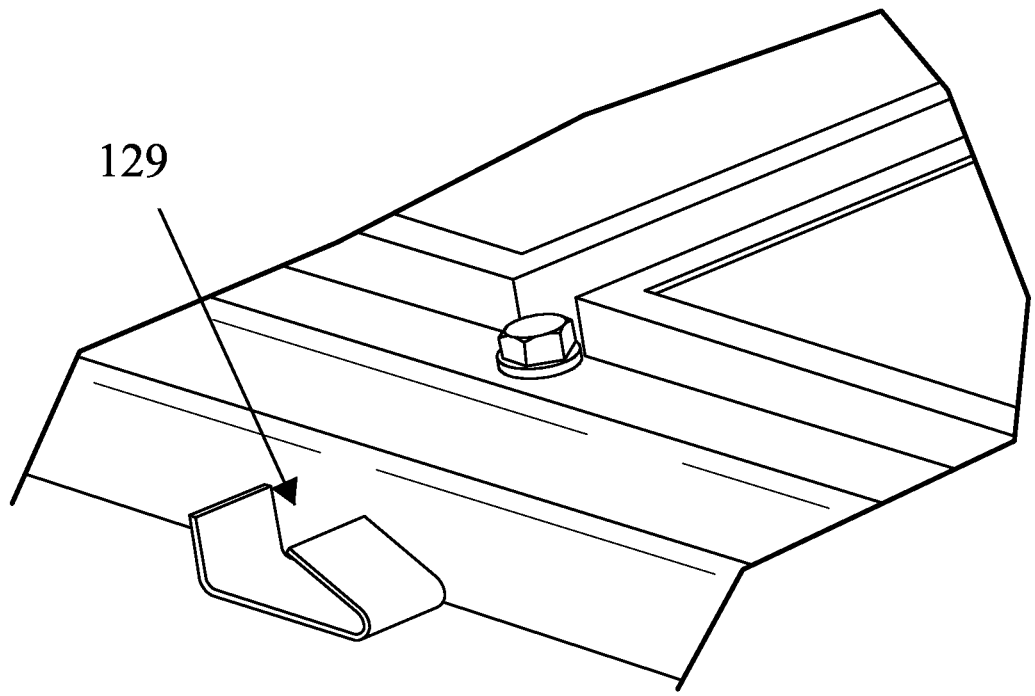
FIG. 17 is an enlarged top perspective view of the solar panel installation of FIG. 16 using a clip according to the present disclosure.
Figure 18:
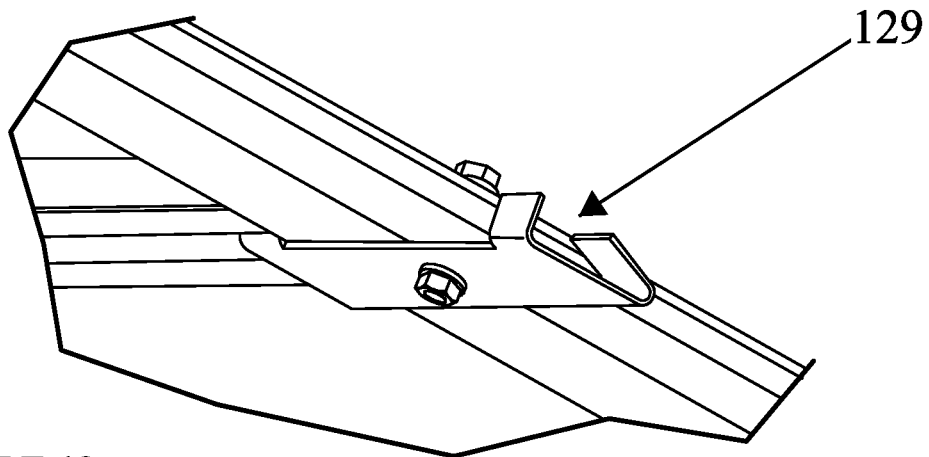
FIG. 18 is an enlarged bottom perspective view of the solar panel installation of FIG. 16 using a clip according to the present disclosure.
Figure 19:
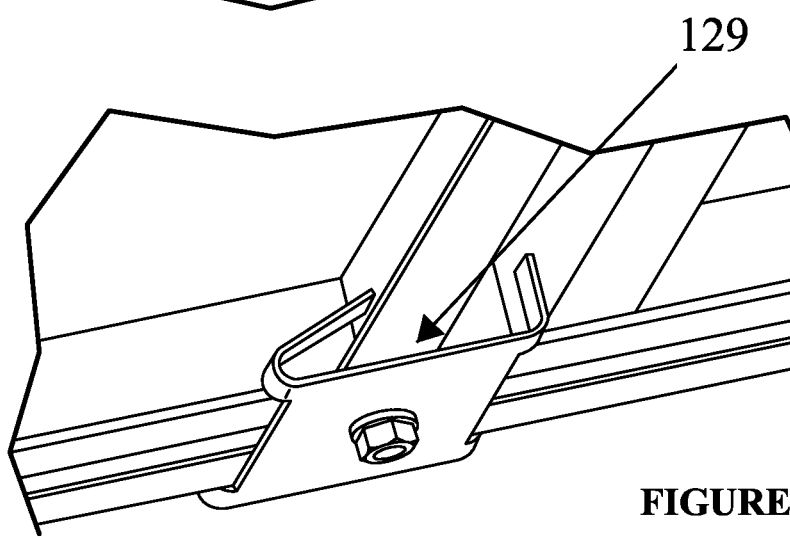
FIG. 19 is an enlarged bottom perspective view of the solar panel installation of FIG. 16 using a clip according to the present disclosure.
Figure 20:
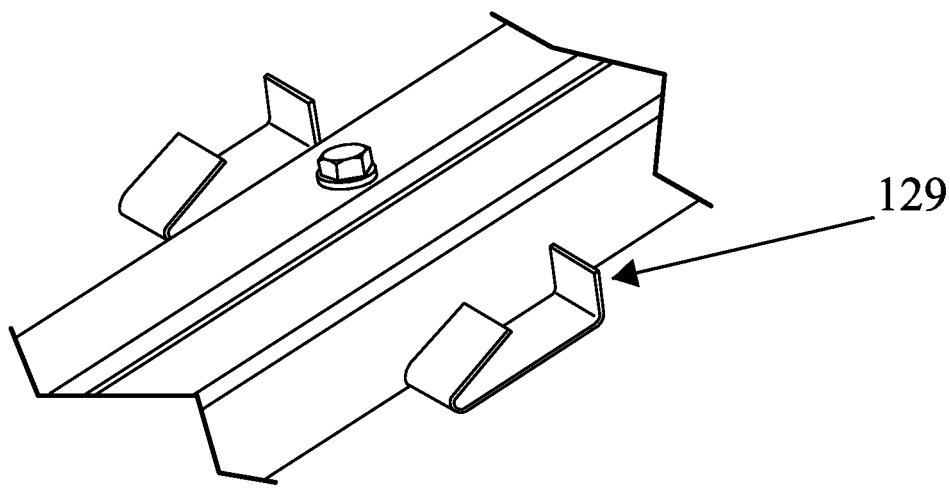
FIG. 20 is a perspective view of a clip attached to a rail according to the present disclosure.
Figure 21:
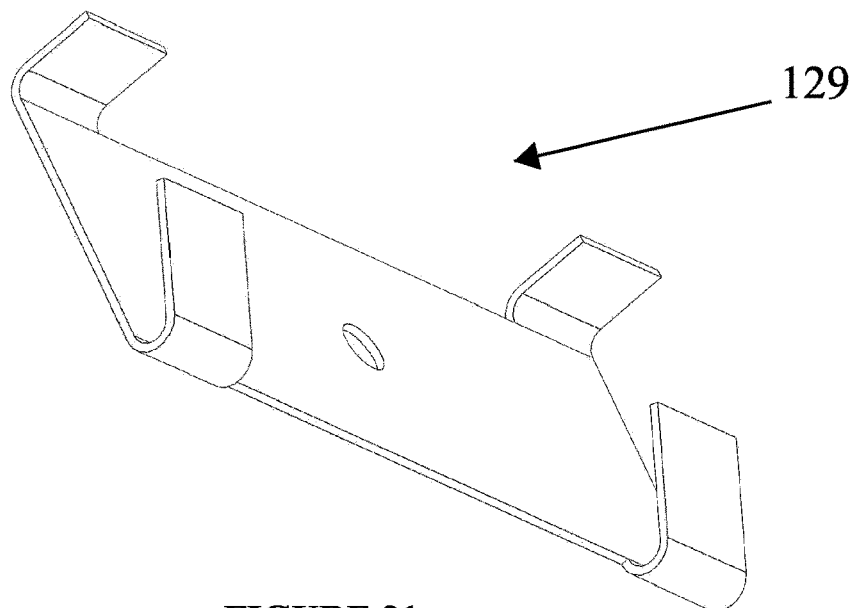
FIG. 21 is a top perspective view of the clip of FIG. 20.
Figure 22:
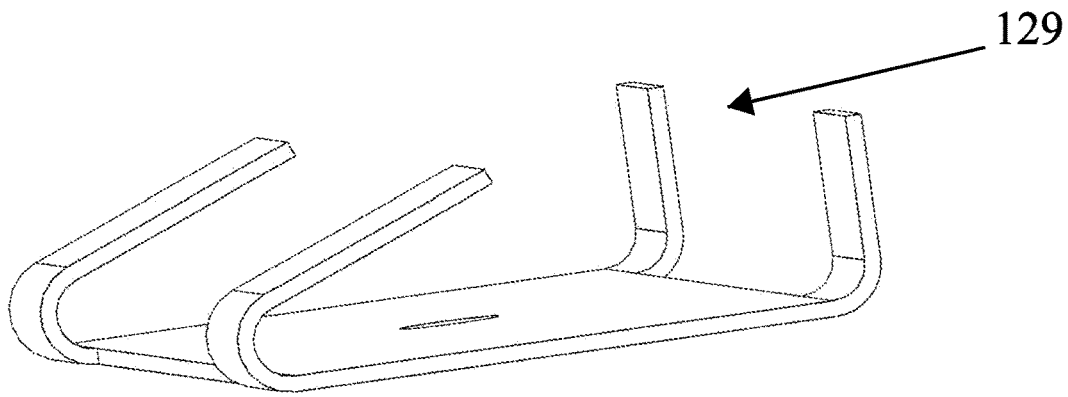
FIG. 22 is a right side perspective view of the clip of FIG. 20.
Figure 23:
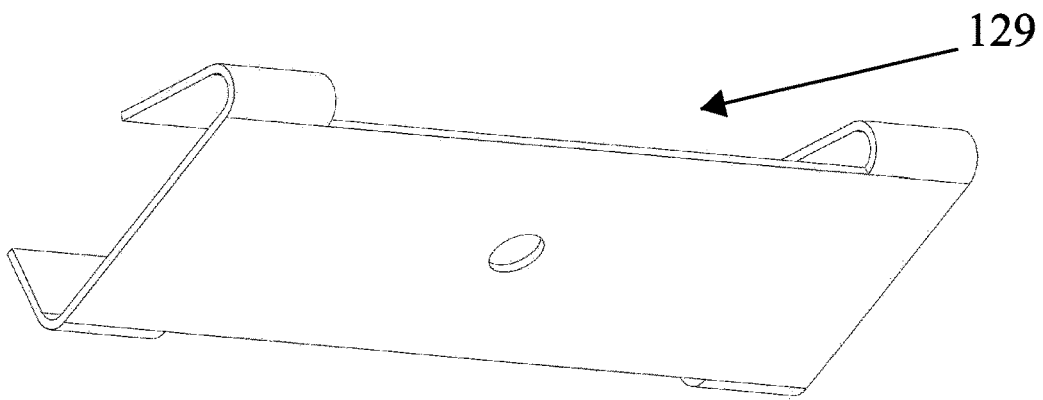
FIG. 23 is a bottom perspective view of the clip of FIG. 20.
Figure 24:
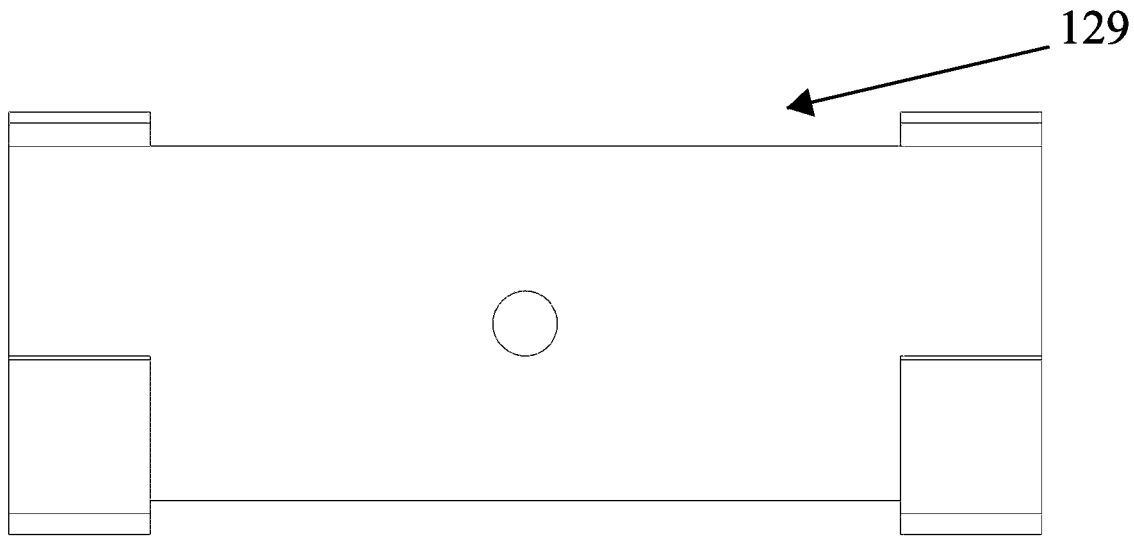
FIG. 24 is a top plan view of the clip of FIG. 20.
Figure 25:
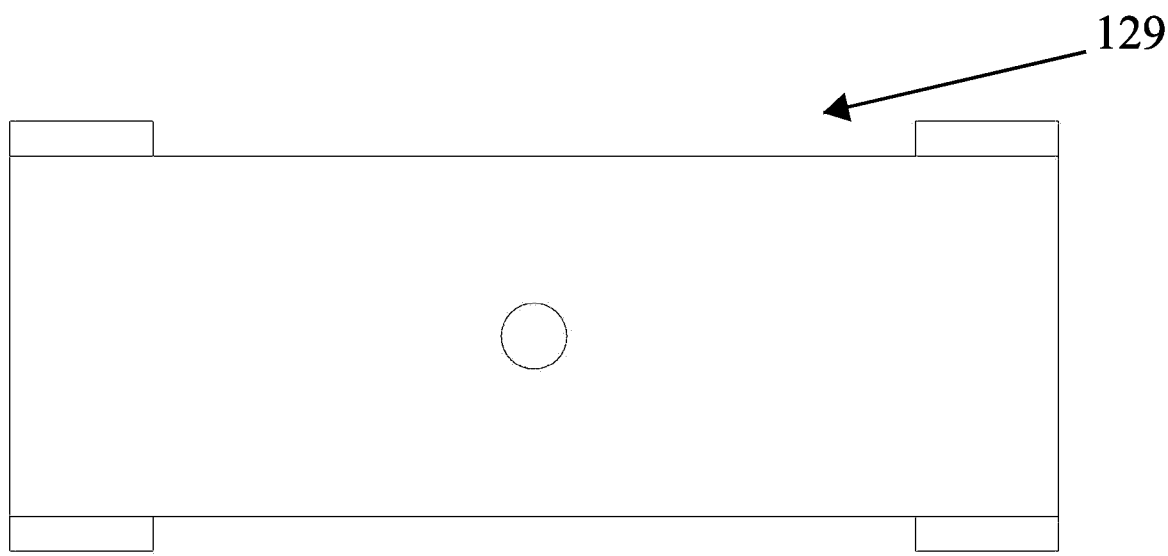
FIG. 25 is a bottom plan view of the clip of FIG. 20.
Figure 29:
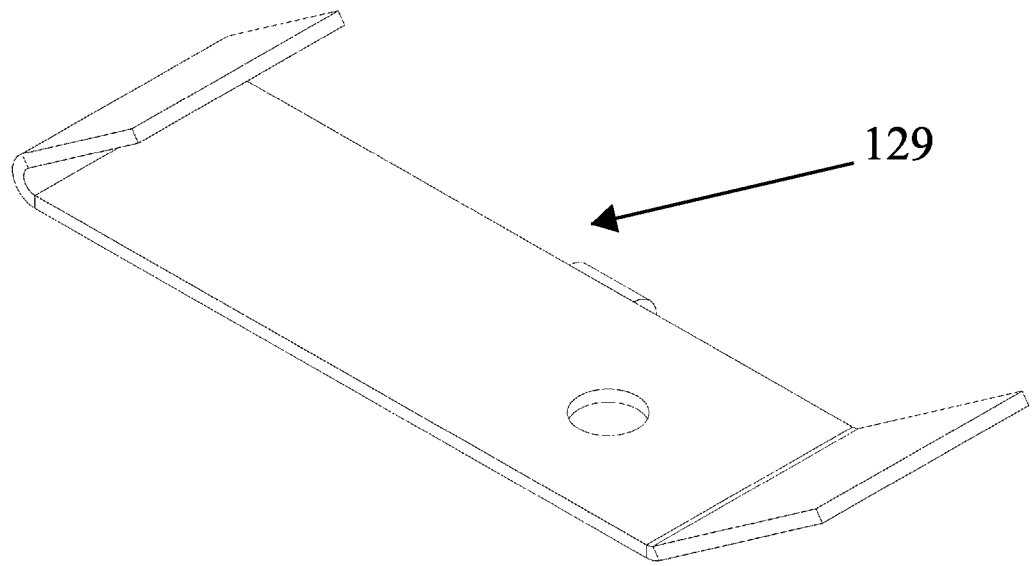
FIG. 29 is a top perspective view of the clip of FIG. 28.
Figure 30:
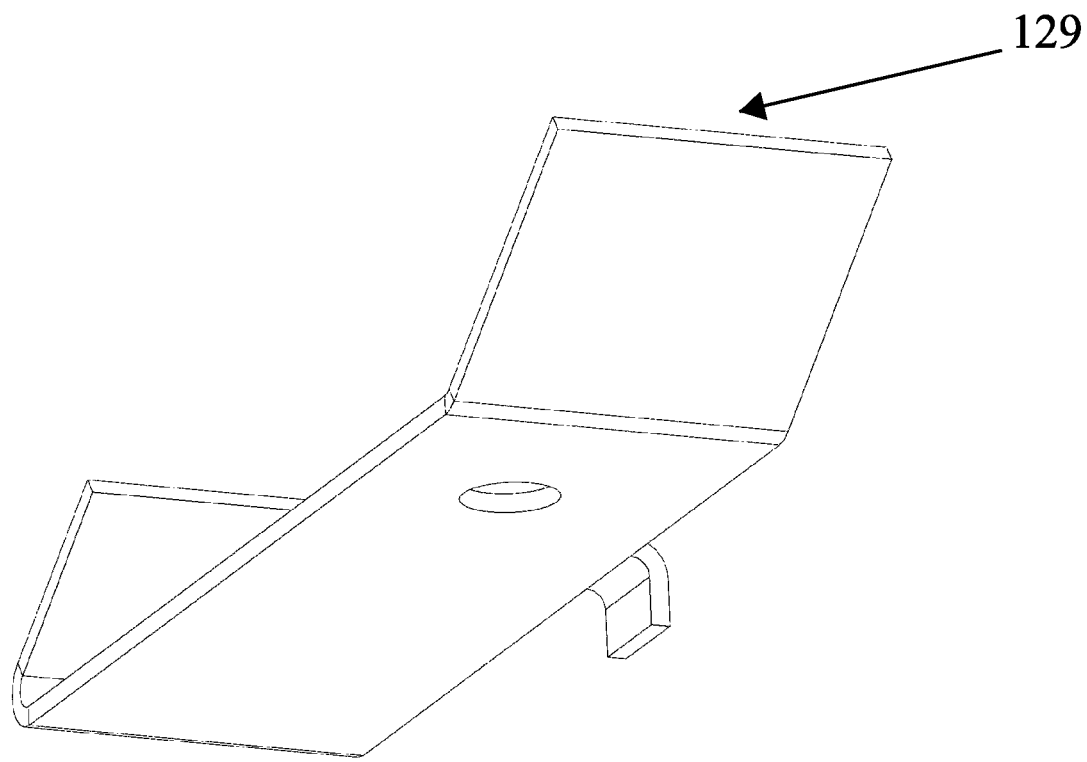
FIG. 30 is a bottom perspective view of the clip of FIG. 28.
Figure 31:
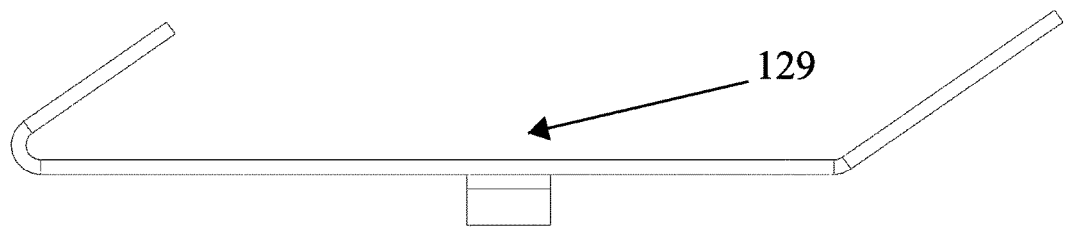
FIG. 31 is a right side elevation view of the clip of FIG. 28.
Figure 32:
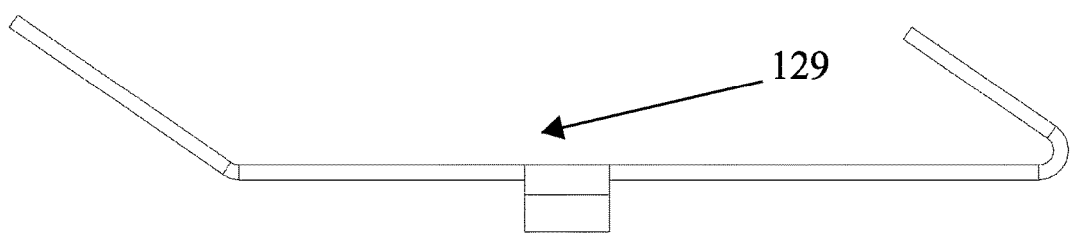
FIG. 32 is a left side elevation view of the clip of FIG. 28.
Figure 33:
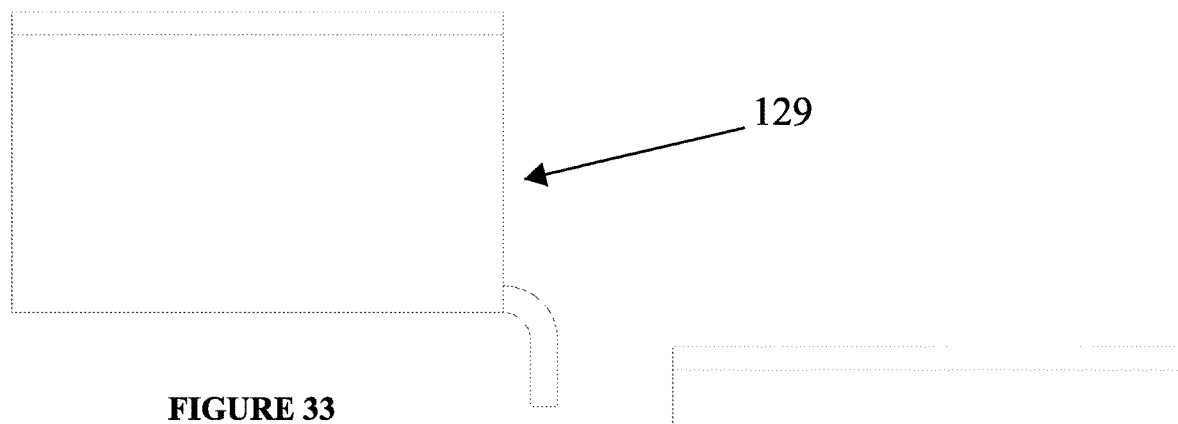
FIG. 33 is a rear elevation view of the clip of FIG. 28.
Figure 34:
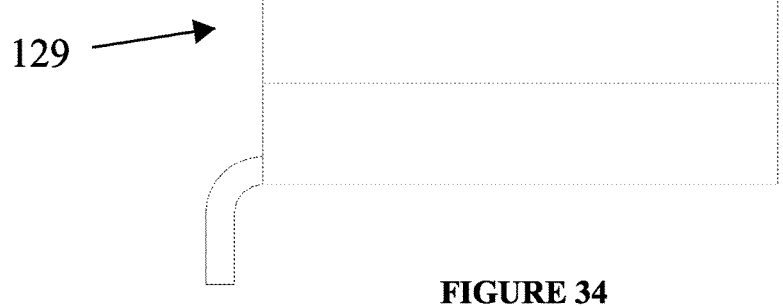
FIG. 34 is a front elevation view of the clip of FIG. 28.
Figure 35:
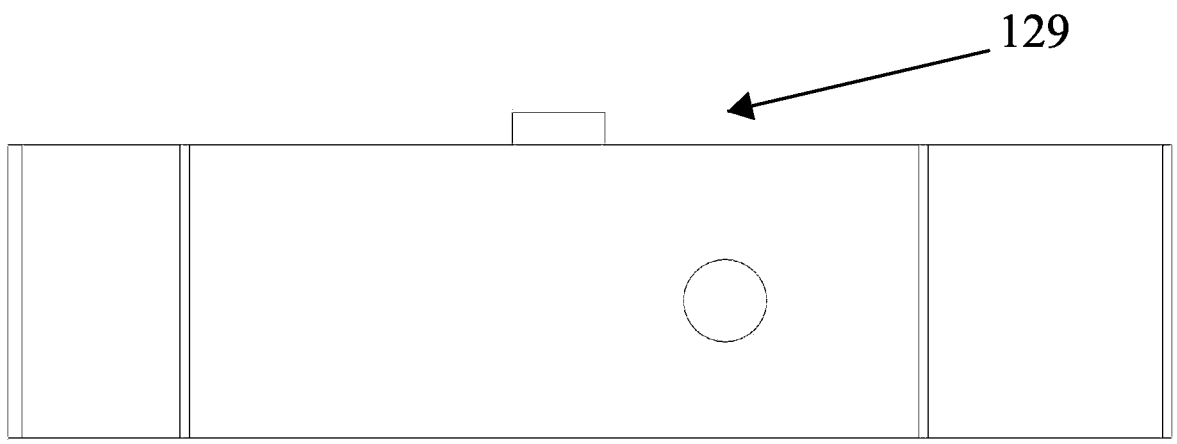
FIG. 35 is a top plan view of the clip of FIG. 28.
Figure 36:
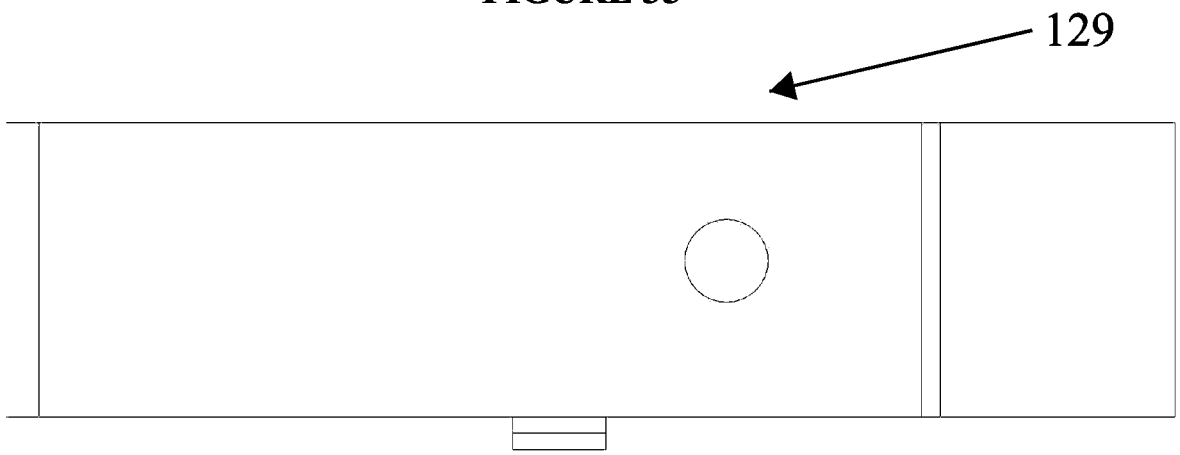
FIG. 36 is a bottom plan view of the clip of FIG. 28.

FIGS. 16-36 show a resilient clip 129 with yet different configurations that operate in the same manner as the resilient clips 49, 89, 105 described hereinabove, and also a solar panel installation (shown in FIG. 16) using the resilient clips 129, according to various additional embodiments of the present disclosure. The resilient clip 129 may have one end or barb or hook that is angled inwardly at an acute angle relative a straight portion of the clip 129, and an opposite end or barb or hook that is angled at either an orthogonal angle or an obtuse angle relative to the straight portion of the clip 129, as shown in FIGS. 17-36. More than one angled portion or barb or hook may also be disposed on an end of the clip 129 and also be spaced apart so that they will be disposed on opposite sides of a rail or other structure in the installation as shown in FIGS. 18-25. Each of the clips 129 shown in FIGS. 16-36 may be employed in the method of the disclosure, as described herein.

Figure 37:
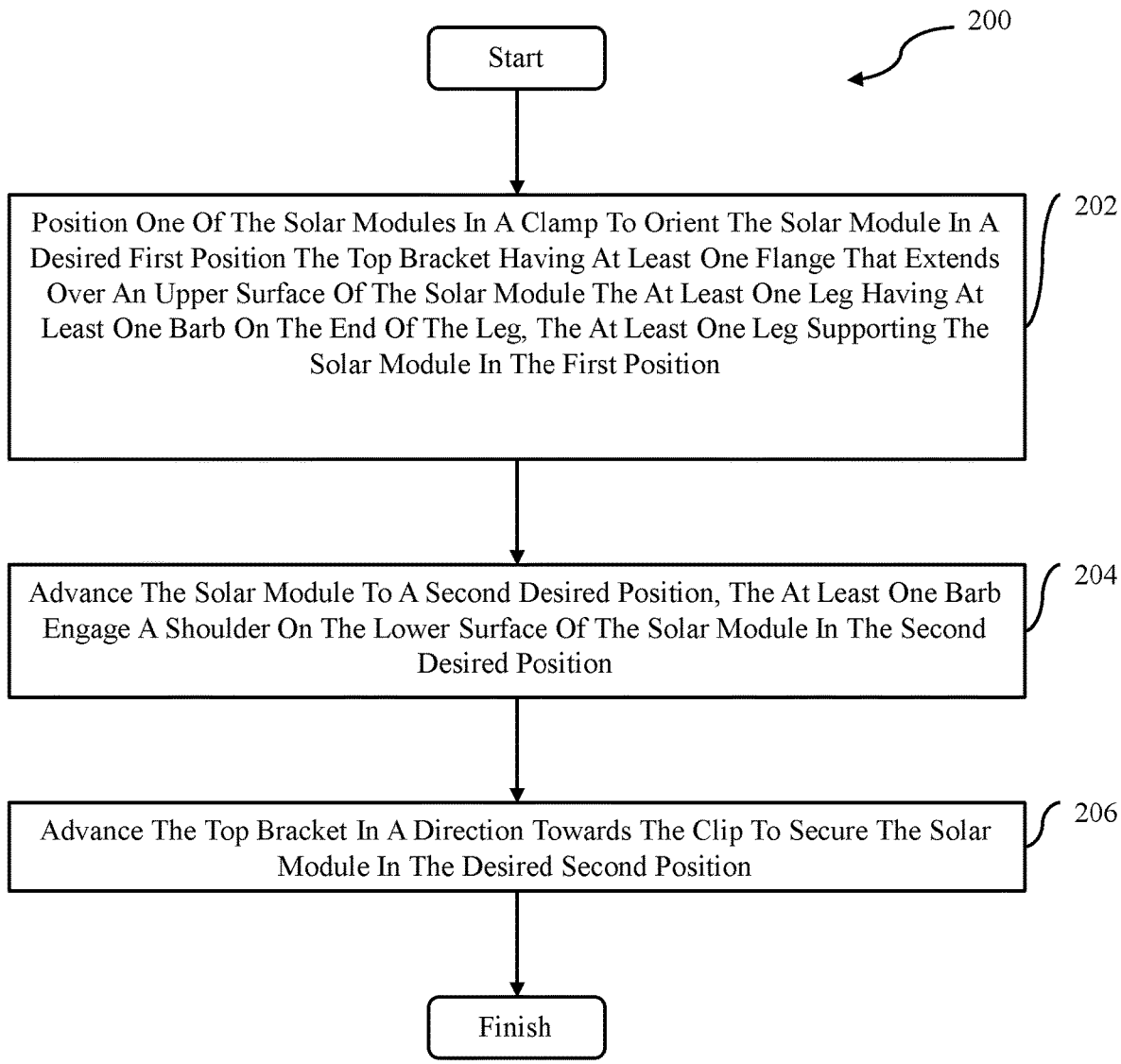
FIG. 37 is a flow diagram illustrating a method according to one embodiment of the present disclosure.

FIG. 37 illustrates a method 200 according to one embodiment of the disclosure. The method 200 includes a step 202 of positioning one of the solar modules in a clamp to orient the solar module in a desired first position. The clamp has a top bracket and a resilient clip operatively connected to the top bracket. The top bracket has at least one flange that extends over an upper surface of the solar module. The clip has at least one leg that extends under a lower surface of the solar module. The at least one leg has at least one barb on the end of the leg. The at least one leg supports the solar module in the first position. The method 200 also includes a step 204 of advancing the solar module to a second desired position. The at least one barb engages a shoulder on the lower surface of the solar module in the second desired position. The method 200 further includes a step 206 of advancing the top bracket in a direction towards the clip to secure the solar module in the desired second position.

While certain representative embodiments and details have been shown for purposes of illustrating the invention, it will be apparent to those skilled in the art that various changes can be made without departing from the scope of the disclosure, which is further described in the following appended claims.

What is claimed is:

1. A method for mounting solar modules comprising:
   positioning one of the solar modules in a clamp to orient the solar module in a desired first position, the clamp having a top bracket and a resilient clip operatively connected to the top bracket, the top bracket having at least one flange that extends over an upper surface of the solar module, the resilient clip having at least one leg that extends under a lower surface of the solar module, the at least one leg having at least one barb on the end of the leg, the at least one barb extending from the leg in a direction toward the top bracket, the at least one leg supporting the solar module in the first position;

advancing the solar module toward a center portion of the resilient clip over the at least one barb to a desired second position; and after advancing the solar module to the desired second position, securing the solar module with the clamp.

2. The method of claim 1, wherein the at least one barb engages a shoulder on the lower surface of the solar module in the desired second position.

3. The method of claim 2, wherein the step of securing the solar module with the clamp includes a step of advancing the top bracket in a direction towards the clip to secure the solar module in the desired second position.

4. The method of claim 1, wherein the at least one leg of the clip ends in a hook, the hook engaging an end of a bracket positioned on an end of the solar module.

5. The method of claim 1, wherein a bolt extends between the top bracket and the resilient clip, a spring positioned on the bolt and engaging the top bracket and the resilient clip, the spring providing a biasing force that spaces the top bracket away from the resilient clip.

* * * * *